United States Patent
Jang et al.

(10) Patent No.: US 11,893,435 B2
(45) Date of Patent: Feb. 6, 2024

(54) INTERNAL VOLTAGE GENERATION CIRCUIT OF SMART CARD AND SMART CARD INCLUDING THE SAME

(71) Applicant: SAMSUNG ELECTRONICS CO., LTD., Suwon-si (KR)

(72) Inventors: Eunsang Jang, Hwaseong-si (KR); Junho Kim, Seoul (KR); Inhyuk Kim, Hanam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 238 days.

(21) Appl. No.: 17/232,298

(22) Filed: Apr. 16, 2021

(65) Prior Publication Data

US 2021/0406631 A1 Dec. 30, 2021

(30) Foreign Application Priority Data

Jun. 25, 2020 (KR) .......................... 10-2020-0077690
Aug. 26, 2020 (KR) .......................... 10-2020-0108026

(51) Int. Cl.
*G05B 19/00* (2006.01)
*G05B 23/00* (2006.01)
(Continued)

(52) U.S. Cl.
CPC ....... *G06K 19/0718* (2013.01); *G06K 19/077* (2013.01); *G06K 19/0715* (2013.01);
(Continued)

(58) Field of Classification Search
CPC .......... G06K 19/0718; G06K 19/0715; G06K 19/0723; G06K 19/077; H02M 3/33507; H02M 3/33584
See application file for complete search history.

(56) References Cited

U.S. PATENT DOCUMENTS 6,588,660 B1 * 7/2003 Buescher ......... G06K 19/07345
235/382
7,028,893 B2 * 4/2006 Goodman ............. G07F 7/1008
235/382
(Continued)

FOREIGN PATENT DOCUMENTS

CN   111027369    4/2020
JP   2015-146699  8/2015
(Continued)

OTHER PUBLICATIONS

European Search Report dated Oct. 1, 2021 in corresponding European Patent Application No. 21167846.1 (9 pages).

*Primary Examiner* — Quang Pham
(74) *Attorney, Agent, or Firm* — F. CHAU & ASSOCIATES, LLC

(57) ABSTRACT

An internal voltage generation circuit of a smart card to perform fingerprint authentication and a smart card includes a first contact switch, a second contact switch, a switched capacitor converter and a bidirectional switched capacitor converter. The first contact switch selectively switches a contact voltage to a first node based on a first switching enable signal, in a contact mode. The second contact switch selectively switches the contact voltage to a second node based on a second switching enable signal, in the contact mode. The bidirectional switched capacitor converter steps down a first driving voltage of the first node to provide a second voltage to the second node in the contactless mode and either steps down the first driving voltage or boosts a second driving voltage of the second node based on a level of the contact voltage to provide a boosted voltage to the first node in the contact mode.

16 Claims, 20 Drawing Sheets

(51) Int. Cl.
*G06F 7/00*     (2006.01)
*G06F 7/04*     (2006.01)
*G06T 1/00*     (2006.01)
*G06T 7/00*     (2017.01)
*G08B 29/00*    (2006.01)
*G08C 19/00*    (2006.01)
*H04B 1/00*     (2006.01)
*H04B 3/00*     (2006.01)
*H04Q 1/00*     (2006.01)
*H04Q 9/00*     (2006.01)
*G06K 19/07*    (2006.01)
*G06K 19/077*   (2006.01)
*H02M 3/335*    (2006.01)

(52) U.S. Cl.
CPC .... *G06K 19/0723* (2013.01); *H02M 3/33507* (2013.01); *H02M 3/33584* (2013.01)

(56) References Cited

U.S. PATENT DOCUMENTS

| | | | |
|---|---|---|---|
| 7,292,462 B2 | 11/2007 | Watanabe et al. | |
| 7,565,108 B2* | 7/2009 | Kotola | G06K 19/0723 |
| | | | 455/410 |
| 7,750,611 B2 | 7/2010 | Lee | |
| 8,200,152 B2* | 6/2012 | Watanabe | G06K 19/0723 |
| | | | 365/96 |
| 8,232,862 B2* | 7/2012 | Lowe | G06K 19/0723 |
| | | | 340/5.53 |
| 10,170,988 B2 | 1/2019 | Ishigaki et al. | |
| 10,540,857 B1* | 1/2020 | Day | G07G 1/0045 |
| 10,740,575 B1* | 8/2020 | Kim | G06K 19/0723 |
| 11,055,683 B1* | 7/2021 | Bartholomew | G06Q 20/341 |
| 11,521,659 B2* | 12/2022 | Lee | G11C 5/147 |
| 2005/0207624 A1* | 9/2005 | Ehlers | G07C 9/257 |
| | | | 340/5.6 |
| 2007/0069010 A1* | 3/2007 | Mestres | G06K 19/07354 |
| | | | 235/492 |
| 2007/0073619 A1* | 3/2007 | Smith | G07C 9/257 |
| | | | 705/41 |
| 2007/0228154 A1* | 10/2007 | Tran | G06K 7/10297 |
| | | | 235/492 |
| 2008/0084193 A1* | 4/2008 | Baglin | G05F 1/56 |
| | | | 323/265 |
| 2008/0201265 A1* | 8/2008 | Hewton | G06Q 20/40145 |
| | | | 235/492 |
| 2009/0160606 A1* | 6/2009 | Miller | G07C 9/00817 |
| | | | 340/5.54 |
| 2009/0322477 A1* | 12/2009 | Celorio | G07C 9/257 |
| | | | 340/5.82 |
| 2010/0039234 A1* | 2/2010 | Soliven | H04B 5/02 |
| | | | 340/10.1 |
| 2011/0042464 A1* | 2/2011 | Itay | G06Q 20/352 |
| | | | 235/492 |
| 2012/0086282 A1* | 4/2012 | Lee | G05F 1/614 |
| | | | 307/82 |
| 2013/0207786 A1* | 8/2013 | Hutzler | G06V 40/70 |
| | | | 235/492 |
| 2016/0255222 A1* | 9/2016 | Sakata | H04N 1/00803 |
| | | | 358/1.13 |
| 2016/0371527 A1* | 12/2016 | Suwald | G06V 40/1359 |
| 2017/0293342 A1* | 10/2017 | Field | G06F 1/26 |
| 2018/0005244 A1* | 1/2018 | Govindarajan | G06Q 20/40 |
| 2018/0129831 A1* | 5/2018 | Yokoi | H01L 27/1225 |
| 2018/0276519 A1* | 9/2018 | Benkley, III | G06F 21/45 |
| 2019/0050611 A1* | 2/2019 | Carey | G06K 19/07309 |
| 2019/0179438 A1* | 6/2019 | Benkley, III | G06F 3/044 |
| 2019/0236320 A1* | 8/2019 | Ahluwalia | G06K 19/0718 |
| 2019/0355395 A1* | 11/2019 | Jeong | G11C 16/30 |
| 2020/0005108 A1* | 1/2020 | Frandsen | G06K 19/0716 |
| 2020/0067706 A1* | 2/2020 | Pala | H04L 9/0891 |
| 2020/0311509 A1* | 10/2020 | Benkley, III | G06F 21/32 |
| 2020/0334681 A1* | 10/2020 | Govindarajan | G06F 21/64 |
| 2021/0004546 A1* | 1/2021 | Carey | G06K 19/07345 |
| 2021/0056285 A1* | 2/2021 | Lee | G06Q 20/40145 |
| 2021/0067201 A1* | 3/2021 | Wang | H04W 4/80 |
| 2021/0256338 A1* | 8/2021 | Kollig | G06K 19/07769 |
| 2022/0207319 A1* | 6/2022 | Phillips | G06K 19/0718 |
| 2022/0215220 A1* | 7/2022 | Mathieu | G06V 40/1306 |
| 2022/0216137 A1* | 7/2022 | Mathieu | G06K 19/0718 |

FOREIGN PATENT DOCUMENTS

| | | |
|---|---|---|
| JP | 6210324 | 9/2017 |
| KR | 10-2006-0089699 | 8/2006 |
| KR | 10-0907454 | 7/2009 |
| KR | 10-1568814 | 11/2015 |
| KR | 10-1613617 | 4/2016 |

\* cited by examiner

| S | b1 | b2 | b3 | b4 | b5 | b6 | b7 | E |

LSB ... MSB

INTERNAL VOLTAGE GENERATION CIRCUIT OF SMART CARD AND SMART CARD INCLUDING THE SAME

CROSS-REFERENCE TO RELATED APPLICATIONS

This application claims the benefit of priority under 35 USC § 119 to Korean Patent Application No. 10-2020-0077690, filed on Jun. 25, 2020 and to Korean Patent Application No. 10-2020-0108026, filed on Aug. 26, 2020, in the Korean Intellectual Property Office, the disclosures of which are incorporated herein by reference in their entireties.

TECHNICAL FIELD

This disclosure relates generally to smart cards and more particularly to internal voltage generation circuits of smart cards performing fingerprint authentication, and smart cards including the same.

DISCUSSION OF THE RELATED ART

Smart cards, also called chip cards or integrated circuit (IC) cards, may be classified into contact cards, contactless cards, and "combi-cards" ("hybrid cards") depending on how the device is used. A contact card includes on its surface a contact terminal to which external power is supplied. A contactless card includes a non-contact type terminal, such as an antenna (e.g. a coil) that receives a radio frequency (RF) signal to generate a power supply voltage. A combi-card may operate as a contact card in a contact mode and as a contactless card in a contactless mode.

SUMMARY

Example embodiments provide an internal voltage generation circuit in a smart card to perform fingerprint authentication, capable of providing a driving voltage having various levels in a contact mode and a contactless mode, and a smart card including the same.

According to some example embodiments, an internal voltage generation circuit of a smart card to perform a fingerprint authentication includes a first contact switch, a second contact switch, a switched capacitor converter, a bidirectional switched capacitor converter, a mode selector, and a control signal generator. The first contact switch selectively switches a contact voltage to a first node based on a first switching enable signal, in a contact mode. The second contact switch selectively switches the contact voltage to a second node based on a second switching enable signal, in the contact mode. The switched capacitor converter steps down a contactless voltage induced by an electromagnetic (EM) wave received from the card reader to provide a contactless mode first driving voltage to the first node in a contactless mode. The bidirectional switched capacitor converter, connected to the first node and the second node, in the contactless mode, steps down the contactless mode first driving voltage at the first node to provide a contactless mode second voltage to the second node and, in the contact mode, either steps down a contact mode first driving voltage at the first node to provide a contact mode second driving voltage to the second node, or boosts a contact mode second driving voltage at the second node based on a level of the contact voltage to provide a boosted voltage to the first node. The mode selector outputs a first mode signal designating one of the contact mode and the contactless mode, a second mode signal designating one of sub-modes of the contact mode, and selects a highest voltage among the contact voltage, the contactless voltage and the first driving voltage as a control voltage to be output. The control signal generator generates a first power-down signal, a second power-down signal, the first switching enable signal and the second switching enable signal based on the first mode signal and the second mode signal.

According to some example embodiments, a smart card to perform a fingerprint authentication, includes a matching circuit and a smart card chip. The matching circuit provides a contactless voltage induced from an EM wave transmitted by an external card reader without electrical contact between the smart card and the card reader. The smart card chip is coupled to the matching circuit through a first power terminal and a second power terminal. The smart card chip includes a connection terminal, an internal voltage generation circuit, a fingerprint recognition sensor and a processor. The connection terminal receives a contact voltage from the card reader when the smart card is in electrical contact with the card reader. The internal voltage generation circuit generates a first driving voltage and a second driving voltage based on the contactless voltage in a contactless mode, and generates the first driving voltage and the second driving voltage based on the contact voltage at respective levels corresponding to a class associated with a level of the contact voltage in a contact mode. The fingerprint recognition sensor operating based on the first driving voltage, generates a fingerprint image signal based on an input fingerprint. The processor operates based on the second driving voltage, and performs the fingerprint authentication based on the fingerprint image signal.

According to some example embodiments, an internal voltage generation circuit of a smart card to perform a fingerprint authentication includes a first contact switch, a second contact switch, a switched capacitor converter, a bidirectional switched capacitor converter, a mode selector, and a control signal generator. The first contact switch selectively switches a contact voltage to a first node based on a first switching enable signal, in a contact mode. The second contact switch selectively switches the contact voltage to a second node based on a second switching enable signal, in the contact mode. The bidirectional switched capacitor converter, connected to the first node and the second node, steps down a first driving voltage of the first node to provide a second voltage to the second node in the contactless mode and either steps down the first driving voltage or boosts a second driving voltage of the second node based on a level of the contact voltage to provide a boosted voltage to the first node in the contact mode. The mode selector outputs a first mode signal designating one of the contact mode and the contactless mode, a second mode signal designating one of sub-modes of the contact mode, and selects one of the contact voltage, the contactless voltage and the first driving voltage to output the selected one as a control voltage. The selected one has greatest voltage level from among the contact voltage, the contactless voltage and the first driving voltage. The control signal generator generates a first power-down signal, a second power-down signal, the first switching enable signal and the second switching enable signal based on the first mode signal and the second mode signal. The first contact switch includes a main switch and an assist switch. The main switch includes a first p-channel metal-oxide semiconductor (PMOS) transistor which has a source coupled to the contact voltage and a drain coupled to the first node. The assist switch includes a second PMOS transistor which has a source coupled to a gate of the main switch as a first internal node, a drain coupled to the contact voltage and a gate receiving an on-voltage associated with generating the control voltage. The assist switch is turned-on in response to the on-voltage before the control voltage is generated and prevents overcurrent flowing into the main switch.

In another aspect, a smart card includes a matching circuit configured to provide a contactless voltage induced from an electromagnetic wave transmitted by an external card reader without electrical contact between the smart card and the card reader; and a smart card chip coupled to the matching circuit through a first power terminal and a second power terminal. The smart card chip includes a connection terminal configured to receive a contact voltage from the card reader when the smart card is in electrical contact with the card reader, and an internal voltage generation circuit configured to: generate a first driving voltage and a second driving voltage based on the contactless voltage in a contactless mode, the second driving voltage being lower than the first driving voltage; and generate, from the contact voltage, the first driving voltage and the second driving voltage at respective levels corresponding to a class associated with a level of the contact voltage in a contact mode. The smart card further includes: a first circuit component configured for optimal operation over a first operating voltage range, the first component receiving the first driving voltage for powering its operations; and a second circuit component configured for optimal operation over a second operating voltage range having a midpoint lower than a midpoint of the first operating voltage range, where the second component receiving the second driving voltage for powering its operations.

In various embodiments, an internal voltage generation circuit of a smart card to perform fingerprint authentication and a smart card including the same may include a first contact switch, a second contact switch, a switched capacitor converter and a the bidirectional switched capacitor converter which generate the second driving voltage used for operating the logic circuit block and the first driving voltage used for operating the fingerprint recognition sensor even when a level of the contact voltage varies based on a class of the card reader. Therefore, the smart card may suitably operate based on various voltage levels. Further, performance of the smart card may be enhanced by optimizing driving voltages applied to various circuit components, where the driving voltages are derived from the contact voltage or the contactless voltage in the respective modes.

BRIEF DESCRIPTION OF THE DRAWINGS

The above and other features of the present disclosure will become more apparent by describing in detail example embodiments thereof with reference to the accompanying drawings.

DETAILED DESCRIPTION OF EMBODIMENTS

Figure 1:
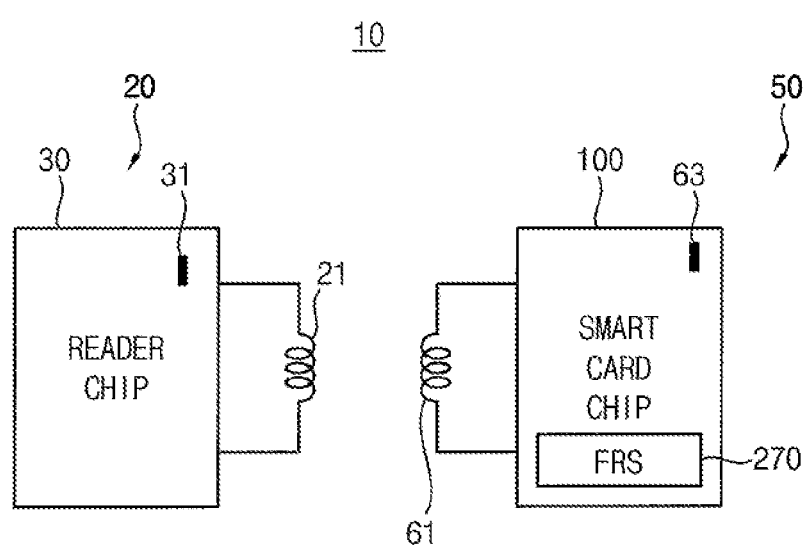
FIG. 1 is a diagram illustrating a smart card system according to some example embodiments.

Example embodiments of the present disclosure will be described more fully hereinafter with reference to the accompanying drawings. Like reference numerals may refer to like elements throughout the accompanying drawings.

In the following description, for brevity, elements and signals introduced with a label followed by a legend may subsequently be referred to using just the label or a shortened version of the label. For instance, "first driving voltage VDDP" may be subsequently referred to as just "voltage VDDP" or "VDDP", and "fingerprint recognition sensor 270" may be later referred to as just "sensor 270".

FIG. 1 is a diagram illustrating a smart card system, 10, according to some example embodiments. The smart card system 10 may include a card reader 20 and a smart card 50. The card reader 20 may include a reader chip 30 and an antenna 21, e.g., a near field antenna such as a coil. The reader chip 30 may include a card socket 31 which provides a voltage to the smart card 50 and exchanges data with the smart card 50 when the smart card 50 is in contact with the card socket 31. The smart card chip 100 may include a contact terminal 63. When the smart card 50 is inserted into the card socket 31, the reader chip 30 provides an operating voltage to the smart card 50 through the contact terminal 63, recognizes the smart card 50 and exchanges secure data such as payment data or personal data with the smart card 50. The smart card 50 may include an antenna 61 and a smart card chip 100. The antennas 21 and 61 may be near field antennas such as coils. Hereafter, a payment data exchange will be used as one example of a secure data exchange.

The smart card 50 may communicate with the card reader 20 through the antenna 61 in a contactless manner, may receive the operating voltage from the card reader 20 and may exchange payment data with the card reader 20. The contactless manner communication may occur when the smart card 50 is placed proximate to the card reader 20 but not inserted within the socket 31 of the card reader 20. When the smart card 50 is inserted into the card socket 31, the smart card 50 may receive the operating voltage through the contact terminal 63 and may exchange payment data with the card reader 20 through the contact terminal 63.

When the smart card 50 communicates with the card reader 20 in a contactless manner, the smart card 50 may receive the operating voltage by converting energy of an electromagnetic (EM) wave, received by the antenna 61, to a voltage. Further, the smart card 50 may exchange payment data with the card reader 20 in electromagnetic form through the antennas 21 and 61.

The smart card 50 may include a fingerprint recognition sensor (FRS) 270 and may perform user authentication on the payment data through the fingerprint recognition sensor 270 when the payment data is exchanged in a contact manner or a contactless manner.

Figure 2:
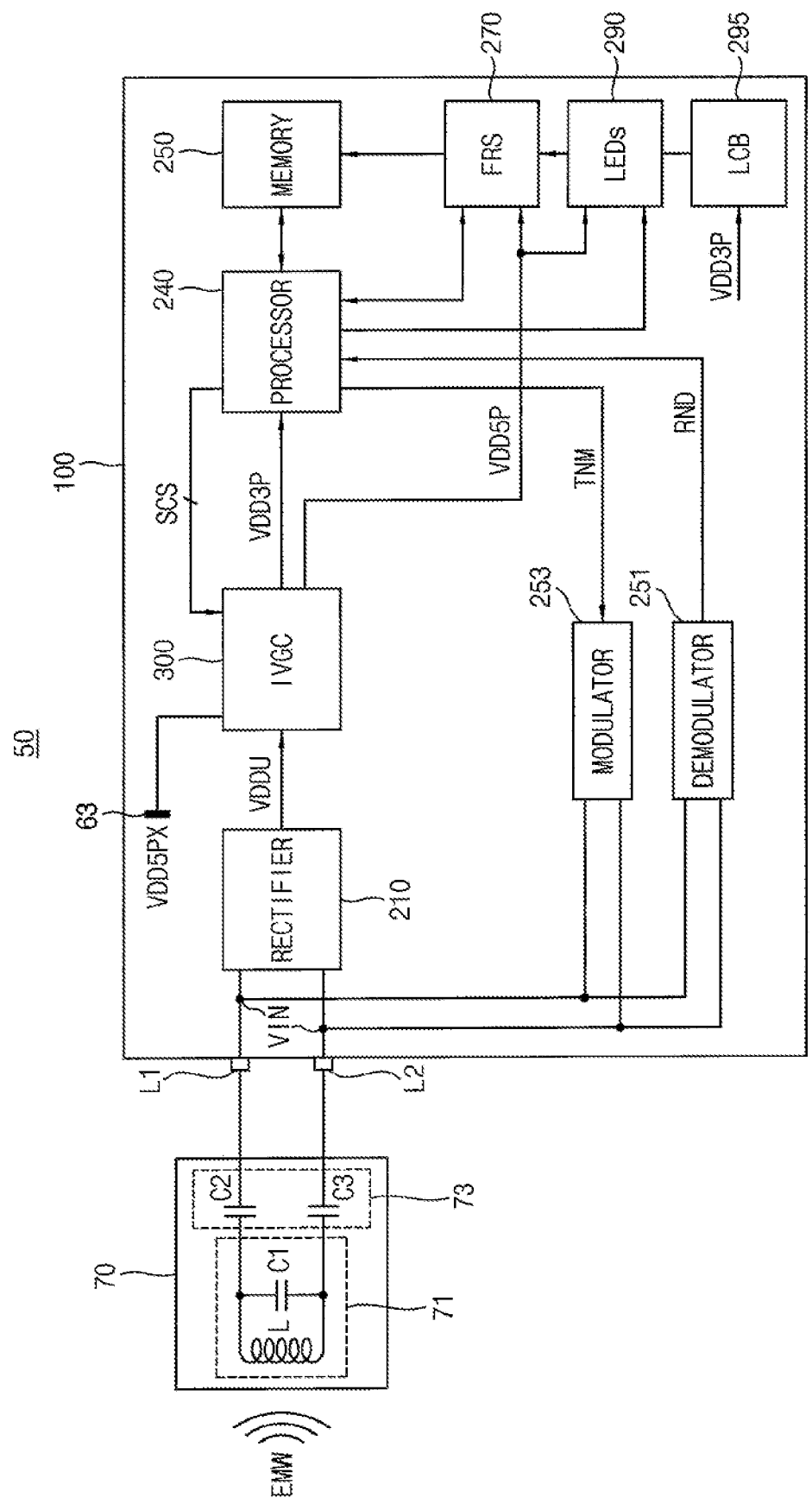
FIG. 2 is a block diagram illustrating an example of the smart card in the smart card system of FIG. 1 according to example embodiments.

FIG. 2 is a block diagram illustrating an example of the smart card 50 in the smart card system of FIG. 1 according to example embodiments. Here, the smart card 50 may include a matching circuit 70 and the smart card chip 100. The smart card chip 100 may be connected to the matching circuit 70 through a first power terminal L1 and a second power terminal L2.

The matching circuit 70 may include a resonance circuit 71 and a filter 73. The resonance circuit 71 may include an antenna L (an example of the antenna 61) and a first capacitor C1. The filter 73 may include a second capacitor C2 and a third capacitor C3 to provide an induction voltage induced in response to an electromagnetic wave EMW and applied across the first and second power terminals L1 and L2. When the smart card 50 is coupled to the card reader 20 in a contactless manner, the matching circuit 70 may supply the induction voltage induced in response to the electromagnetic wave EMW to the smart chip 100 as an input voltage VIN. Thus, the matching circuit 70 may provide a contactless voltage induced from the received wave EMW without electrical contact between the smart card 50 and the card reader 20.

The smart card chip 100 may receive the input voltage VIN from the matching circuit 70 through the first power terminal L1 and the second power terminal L2 in a contactless mode and the smart card chip 100 may receive the voltage VDD5PX provided through the contact terminal 63 in the contact mode.

The smart card chip 100 may include a rectifier 210, an internal voltage generation circuit (IVGC) 300, a mode detector 260, a processor 240, a memory 250, a demodulator 251, a modulator 253, a fingerprint recognition sensor 270, LEDs 290 and a logic circuit block (LCB) 295.

The rectifier 210 may generate a contactless voltage VDDU, which is direct current (DC) voltage, by rectifying the input voltage VIN.

The internal voltage generation circuit (IVGC) 300 may receive the contactless voltage VDDU in the contactless mode, and may receive the contact voltage VDD5PX in the contact mode though the terminal 63. In the contactless mode, the IVGC 300 may generate, based on VDDU, a first driving voltage VDD5P and a second driving voltage VDD3P having a level smaller than that of VDD5P. In the contact mode, the IVGC 300 may generate the first driving voltage VDD5P and the second driving voltage VDD3P based on a class of the card reader 20, according to a level of the contact voltage VDD5PX. In both the contact and contactless modes, the IVGC 300 may provide the second driving voltage VDD3P to the processor 240 and the logic circuit block 295 and may provide the first driving voltage VDD5P to the fingerprint recognition sensor 270 and the LEDs 290. By providing a lower driving voltage (VDD3P) to the processor 240 and logic circuit block 295, power consumption of the smart card chip 100 may be reduced. Further, although the contact voltage VDD5PX may vary based on a class of the card reader 20, the IVGC 300 may generate suitable driving voltages VDD5P and VDD3P for each of the classes by using different control schemes as described hereafter. The generated driving voltages VDD5P and VDD3P may be allowed to differ in the contact mode as compared to the contactless mode, and for the different respective classes in the contact mode, but are generated to have levels falling within acceptable or optimal operating ranges for the various circuit components.

The processor 240 may control the overall operation of the smart card chip 100.

When the signal reception operation is performed, the demodulator 251 generates reception data RND by demodulating the signal supplied from the matching circuit 70 through the first and second power terminals L1 and L2 to provide the reception data RND to the processor 240. The processor 240 may decode the reception data RND and may store at least a portion of the reception data RND in the memory 250.

When the signal transmission operation is performed, the processor 240 reads out the output data from the memory 250 and encodes the output data to provide a transmission data TND to the modulator 253. The modulator 253 may modulate the transmission data TND to provide a modulation signal to the first and second power terminals L1 and L2. For instance, the modulator 253 may generate the modulation signal by performing load modulation with respect to the transmission data TND.

The processor 240 may provide switch control signals SCS to the internal voltage generation circuit 300.

The memory 250 may store a user's original fingerprint registered through a pre-processing. The fingerprint recognition sensor 270 may generate a fingerprint image signal based on user's input fingerprint in a payment operation during the contactless mode and/or the contact mode, and may provide the fingerprint image signal to the processor 240. The processor 240 may compare the fingerprint image signal with the user's original fingerprint and may determine whether the user's input fingerprint matches the user's original fingerprint (e.g., determine whether the input fingerprint is faked) based on a result of the comparison. When the processor 240 determines that the user's input fingerprint matches the user's original fingerprint, the processor 240 may indicate that the user authentication is passed by controlling the LEDs 295 to emit light while performing the user authentication on the payment data associated with the payment operation. When the processor 240 determines that the user's input fingerprint does not match the user's original fingerprint, the processor 240 may indicate that the input fingerprint does not match the user's original fingerprint through the LEDs 295.

Figure 3:
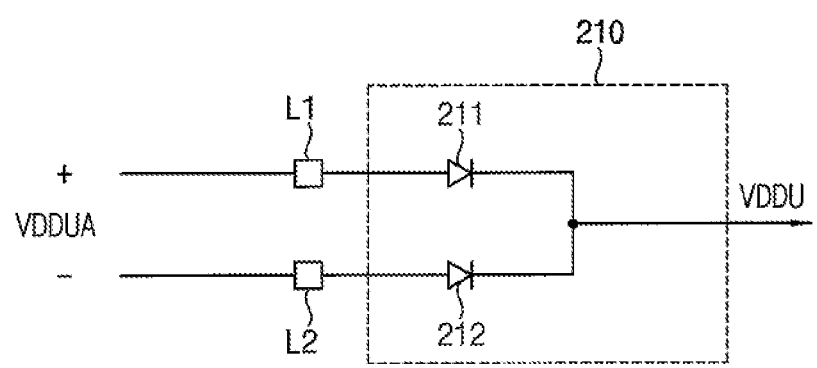
FIG. 3 illustrates an example of the rectifier in the smart card chip in FIG. 2 according to example embodiments.

FIG. 3 illustrates an example of the rectifier in the smart card chip in FIG. 2 according to example embodiments.

Referring to FIG. 3, the rectifier 210 may include a first diode 211 and a second diode 212.

The first diode 211 is connected to the first power terminal L1 and the second diode 212 is connected to the second power terminal L2. The first and second diodes 211 and 212 may rectify an input voltage VDDUA (an example of the voltage VIN across the first and second power terminals L1 and L2 in FIG. 2) to provide the contactless voltage VDDU to the internal voltage generation circuit 300 in the contactless mode.

Figure 4:
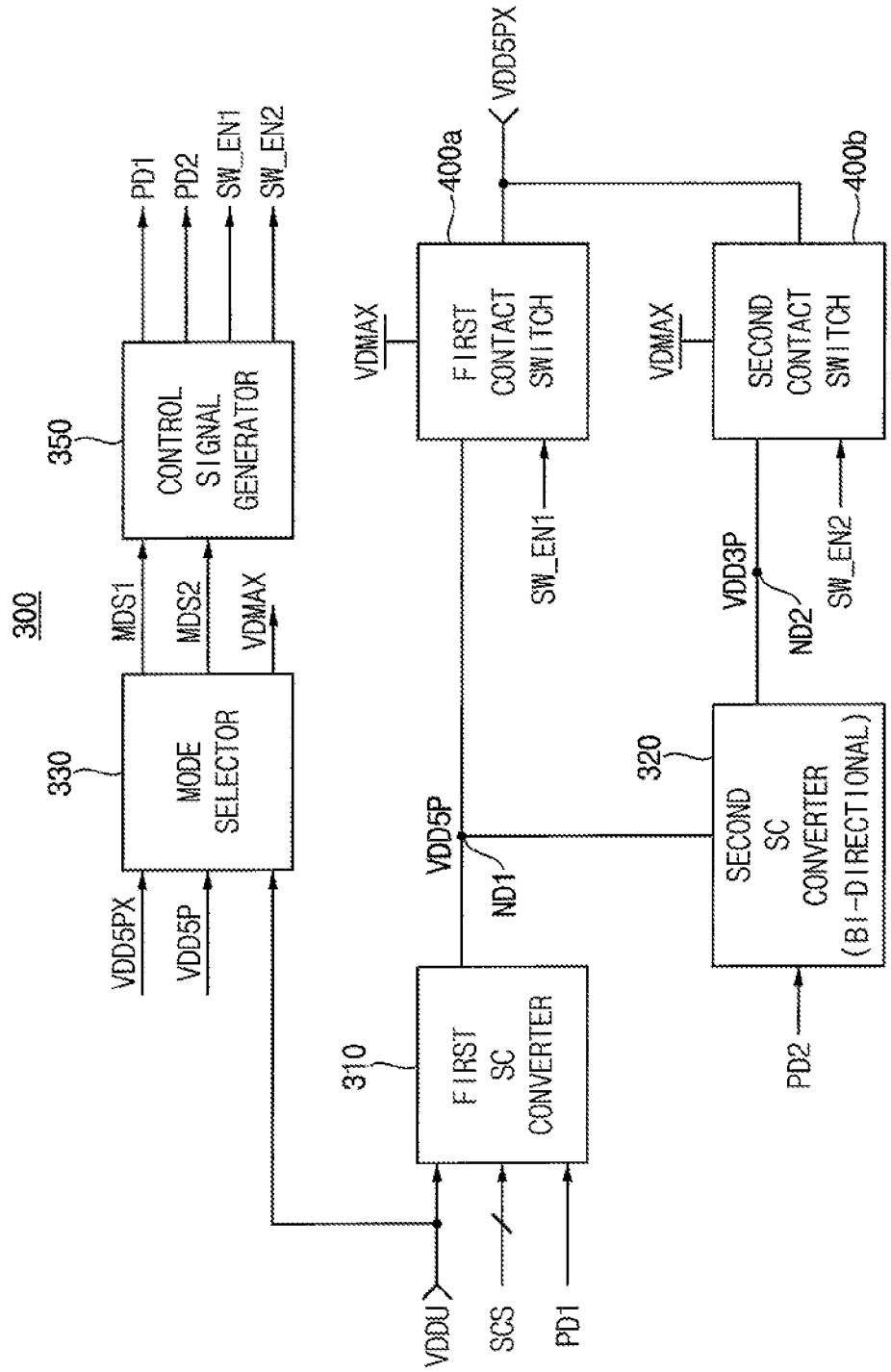
FIG. 4 illustrates an example of the internal voltage generation circuit in the smart card chip in FIG. 2 according to example embodiments.

FIG. 4 is a block diagram illustrating an example of the internal voltage generation circuit in the smart card chip in FIG. 2 according to example embodiments.

Referring to FIG. 4, the internal voltage generation circuit 300 may include a first switched capacitor (SC) converter 310, a second switched capacitor (SC) converter 320, a mode selector circuit ("mode selector") 330, a control signal generator 350, a first contact switch 400a and a second contact switch 400b. The first SC converter 310 may be referred to as a SC converter and the second SC converter 320 may be referred to as a bidirectional switched capacitor converter.

The first contact switch 400a may be connected to a first node ND1 and may selectively switch the contact voltage VDD5PX received from the (external) card reader 20 to the first node ND1 based on a first switching enable signal SW_EN1, in the contact mode.

The second contact switch 400b may be connected to a second node ND2 and may selectively switch the contact voltage VDD5PX received from the card reader 20 to the second node ND2 based on a second switching enable signal SW_EN2, in the contact mode.

The SC converter 310 may be connected to the first node ND1 and may step down ("lower") the contactless voltage VDDU received from the card reader 20 to provide a first (reduced) voltage to the first node ND1 in the contactless mode.

The bidirectional SC converter 320 may be connected to the first node ND1 and the second node ND2, may step down the first driving voltage VDD5P of the first node ND1 to provide a second (reduced) voltage to the second node ND2 ("contactless mode second driving voltage") in the contactless mode. Additionally, the bidirectional SC converter 320 may either lower the first driving voltage VDD5P ("contact mode first driving voltage", which may equal the contact voltage VDD5PX in this case) or boost the second driving voltage VDD3P of the second node ND2, based on a level of the contact voltage to provide a boosted voltage to the first node ND1. Example step down and boosting operations will be described below in connection with FIGS. 11-14.

The mode selector 330 may receive the contact voltage VDD5PX, the contactless voltage VDDU and the first driving voltage VDD5P, may output a first mode signal MDS1 designating either the contact mode or the contactless mode and a second mode signal MDS2 designating one of sub-modes of the contact mode based on the levels of the contact voltage VDD5PX, the contactless voltage VDDU and the first driving voltage VDD5P, and may select a highest voltage from among the contact voltage VDD5PX, the contactless voltage VDDU and the first driving voltage VDD5P to output the selected one as a control voltage VDMAX. The selected one has greatest voltage level from among the contact voltage VDD5PX, the contactless voltage VDDU and the first driving voltage VDD5P.

The mode selector 330 may provide the first mode signal MDS1 and the second mode signal MDS2 to the control signal generator 350. The second mode signal MDS2 may include a plurality of bits and may designate the sub-modes of the contact mode.

The control signal generator 350 may generate a first power-down signal PD1, a second power-down signal PD2, the first switching enable signal SW_EN1 and the second switching enable signal SW_EN2 based on the first mode signal MDS1 and the second mode signal MDS2.

The first power-down signal PD1 may be associated with enabling the SC converter 310, the second power-down signal PD2 may be associated with enabling the bidirectional SC converter 320, the first switching enable signal SW_EN1 may be associated with enabling the first contact switch 400a and the second switching enable signal SW_EN2 may be associated with enabling the second contact switch 400b.

Figure 5:
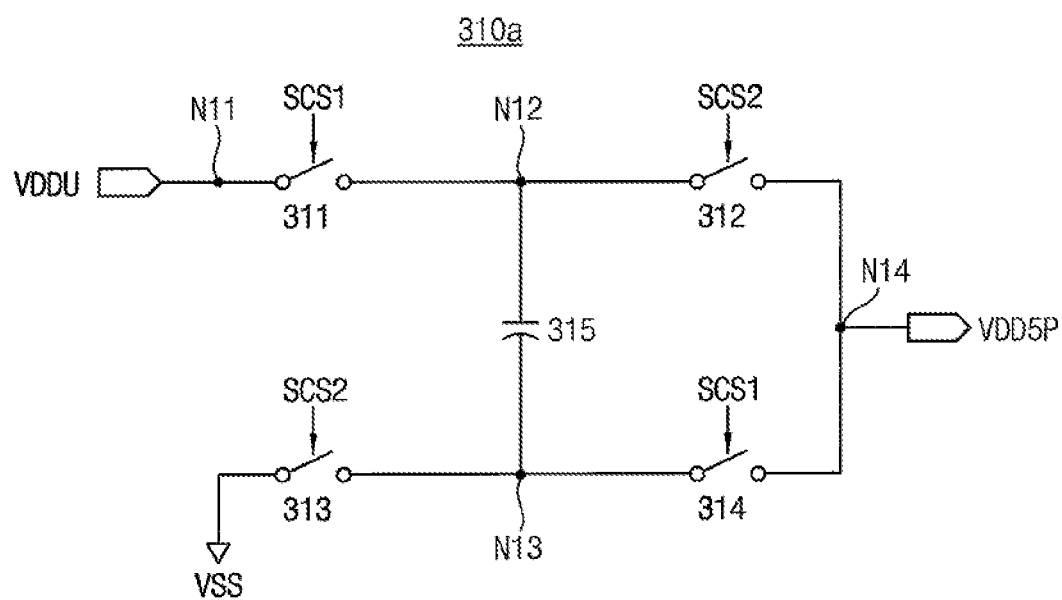
FIG. 5 is a circuit diagram illustrating an example of the switched capacitor converter in the internal voltage generation circuit of FIG. 4 according to example embodiments.

FIG. 5 is a circuit diagram illustrating an example of the switched capacitor converter in the internal voltage generation circuit of FIG. 4 according to example embodiments.

Referring to FIG. 5 a switched capacitor converter 310a may include first, second, third and fourth switches 311, 312, 313 and 314 and a capacitor 315.

The first switch 311 is connected between a first node N11 receiving the contactless voltage VDDU and a second node N12, and is switched in response to a first switch control signal SCS1. The capacitor 315 is coupled between the second node N12 and a third node N13. The second switch 312 is connected between the second node N12 and a fourth node N14 providing the first driving voltage VDD5P, and is switched in response to a second switch control signal SCS2.

The third switch 313 is connected between the third node N13 and a ground voltage VSS, and is switched in response to the second switch control signal SCS2. The fourth switch 314 is connected between the third node N13 and the fourth node N14, and is switched in response to the first switch control signal SCS1.

The first switch control signal SCS1 and the second switch control signal SCS2 may have a same logic level. The first switch 311 and the fourth switch 314 may be turned-on in response to the first switch control signal SCS1 having a low level and may be turned-off in response to the first switch control signal SCS1 having a high level. The second switch 312 and the third switch 313 may be turned-off in response to the second switch control signal SCS2 having a low level and may be turned-on in response to the second switch control signal SCS2 having a high level.

Figure 6:
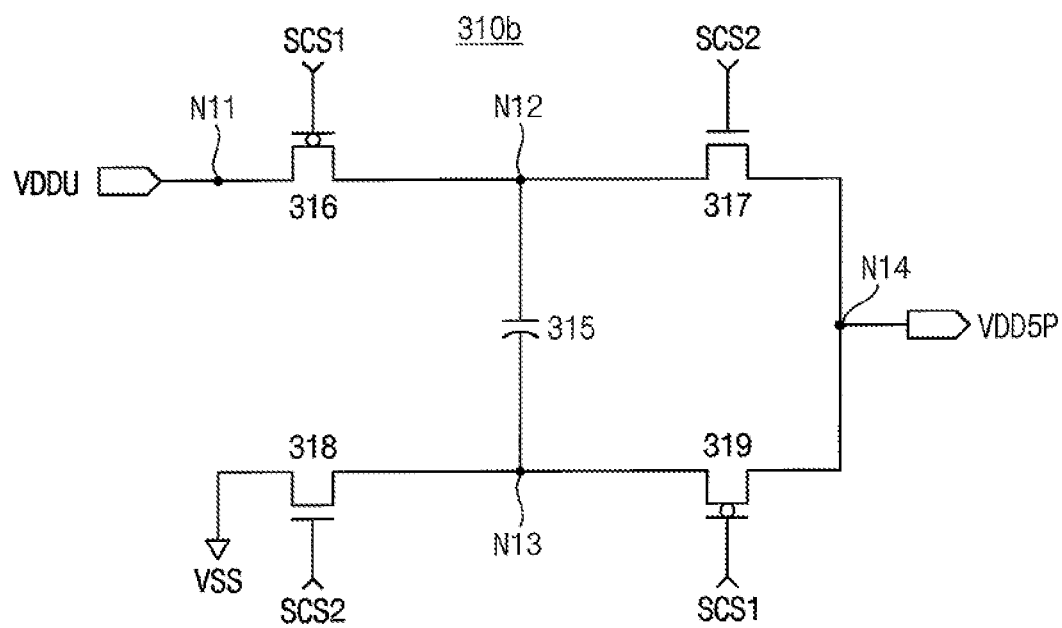
FIG. 6 is a circuit diagram illustrating an example of how switches in the switched capacitor converter of FIG. 5 may be implemented.

FIG. 6 is a circuit diagram illustrating an example of how the switches of the switched capacitor converter of FIG. 5 may be implemented. In FIG. 6, a switched capacitor converter 310b may include p-channel metal-oxide semiconductor (PMOS) transistors 316 and 319, n-channel metal-oxide semiconductor (NMOS) transistors 317 and 318 and a capacitor 315. Transistors 316-319 are examples of the switches 311-314, respectively.

The PMOS transistor 316 is connected between the first node N11 receiving the contactless voltage VDDU and the second node N12, and is turned-on/off in response to the first switch control signal SCS1. The NMOS transistor 317 is connected between the second node N12 and the fourth node N14 providing the first driving voltage VDD5P, and is turned-on/off in response to the second switch control signal SCS2. The capacitor 315 is coupled between the second node N12 and the third node N13.

The NMOS transistor 318 is connected between the third node N13 and the ground voltage VSS, and is turned-on/off in response to the second switch control signal SCS2. The PMOS transistor 319 is connected between the third node N13 and the fourth node N14, and is turned-on/off in response to the first switch control signal SCS1.

Figure 7:
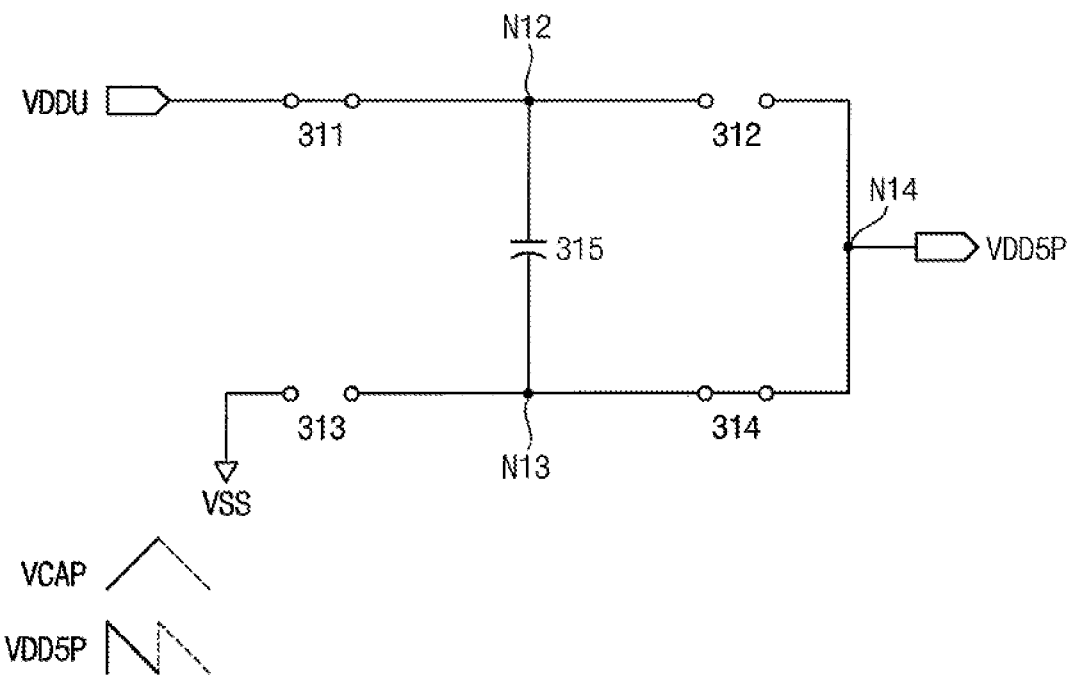
FIG. 7 illustrates an example operation of the switched capacitor converter in FIG. 5.

FIG. 7 illustrates an example operation of the switched capacitor converter in FIG. 5.

An operation of the switched capacitor converter 310b in FIG. 6 may be the same as operation of the switched capacitor converter 310a in FIG. 5.

Referring to FIG. 7, when the first switch 311 and the fourth switch 314 are turned-on and the second switch 312 and the third switch 313 are turned-off during a first phase, a voltage VCAP is stored in the capacitor 315 based on the contactless voltage VDDU, and the first driving voltage VDD5P is provided at the fourth node N14 based on the voltage VCAP stored in the capacitor 315.

Figure 8:
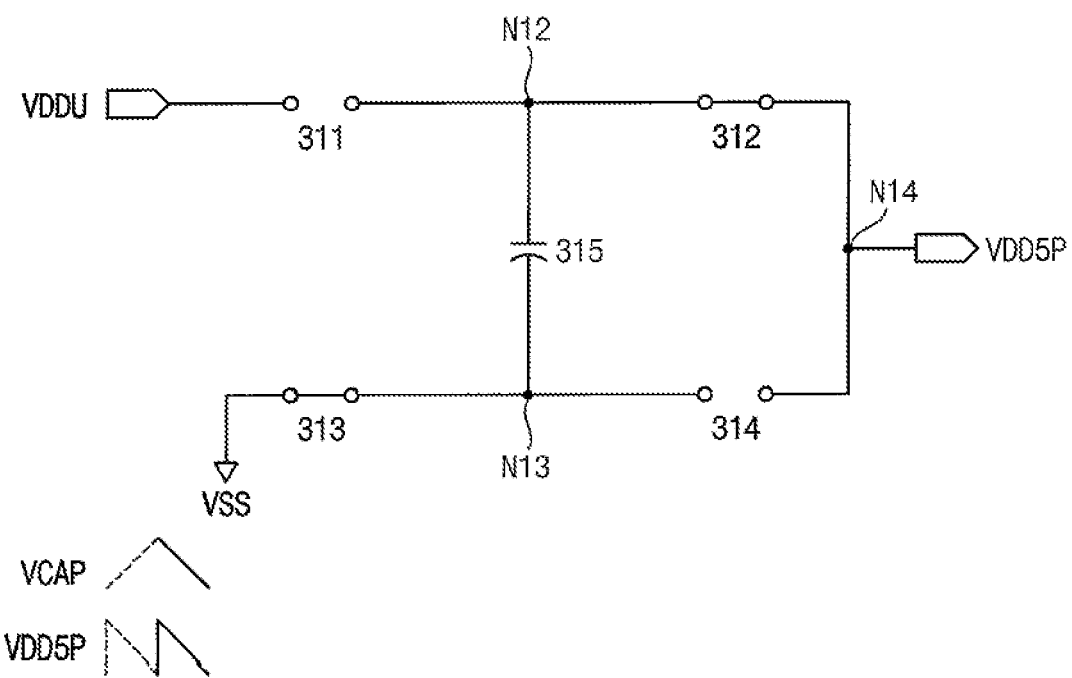
FIG. 8 illustrates an example operation of the switched capacitor converter in FIG. 5.

FIG. 8 illustrates an example operation of the switched capacitor converter in FIG. 5.

An operation of the SC converter 310b in FIG. 6 may be the same as operation of the SC converter 310a in FIG. 5.

Referring to FIG. 8, when the first switch 311 and the fourth switch 314 are turned-off and the second switch 312 and the third switch 313 are turned-on during a second phase, a voltage VCAP stored in the capacitor 315 during the first phase ramps down and the first driving voltage VDD5P is provided at the fourth node N14 based on the voltage VCAP stored in the capacitor 315.

Figure 9:
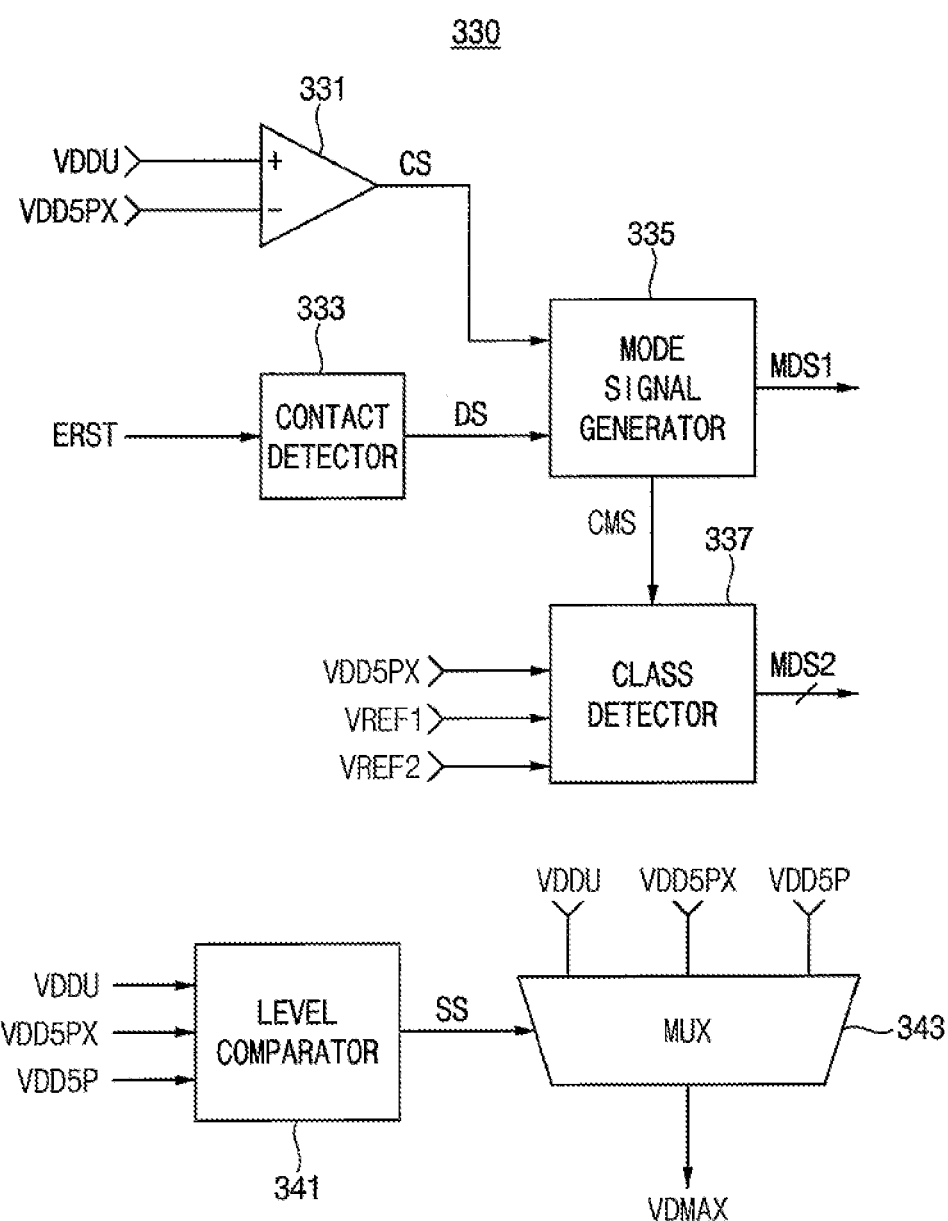
FIG. 9 is a block diagram illustrating an example of the mode selector in the internal voltage generation circuit of FIG. 4 according to example embodiments.

FIG. 9 is a block diagram illustrating an example of the mode selector in the internal voltage generation circuit of FIG. 4 according to example embodiments.

Referring to FIG. 9, the mode selector 330 may include a comparator 331, a contact detector 333, a mode signal generator 335, a class detector 337, a level comparator 341 and a multiplexer 343.

The comparator 331 may compare the contactless voltage VDDU and the contact voltage VDD5PX to output a comparison signal CS indicating a result of the comparison. The contact detector 333 may output a detection signal DS associated with detecting an external reset signal ERST received from the card reader 20 in the contact mode when the smart card 50 is connected to the card reader 20 in a contact manner. The signal DS may have a level/code correlated with a level/code of the signal ERST.

The mode signal generator 335 may generate the first mode signal MDS1 designating the contact mode or the contactless mode and may generate a contact mode signal CMS designating the contact mode based on the comparison signal CS and the detection signal DS. Based on the comparison signal CS indicating a result of the comparison of the contactless voltage VDDU and the contact voltage VDD5PX and the detection signal DS indicating whether the external reset signal ERST is applied, the mode signal generator 335 may generate logic levels of the first mode signal MDS1 and the contact mode signal CMS.

The class detector 337 may be enabled in response to the contact mode signal CMS designating the contact mode, and may compare the contact voltage VDD5PX with a first reference voltage VREF1 and a second reference voltage VREF2 to generate the second mode signal MDS2 indicating a class of the card reader 20, associated with the sub-modes.

The class detector 337 may determine a logic level of the second mode signal MDS2 based on comparing the contact voltage VDD5PX with first reference voltage VREF1 and the second reference voltage VREF2. The second reference voltage VREF2 may be smaller than the first reference voltage VREF1.

In embodiments, the first reference voltage VREF1 may be set to about 4V and the first reference voltage VREF2 may be set to about 2.4V.

For example, when the contact voltage VDD5PX is greater than the first reference voltage VREF1, the second mode signal MDS2 may designate a first sub-mode of the contact mode. For example, when the contact voltage VDD5PX is smaller than the first reference voltage VREF1 and greater than the second reference voltage VREF2, the second mode signal MDS2 may designate a second sub-mode of the contact mode. For example, when the contact voltage VDD5PX is smaller than the second reference voltage VREF2, the second mode signal MDS2 may designate a third sub-mode of the contact mode.

The first sub-mode may indicate that the card reader 20 corresponds to a first class and may provide the contact voltage VDD5PX with about 5V, the second sub-mode may indicate that the card reader 20 corresponds to a second class and may provide the contact voltage VDD5PX with about 3V and the third sub-mode may indicate that the card reader 20 corresponds to a third class and may provide the contact voltage VDD5PX with about 1.8V.

The level comparator 341 may compare the contact voltage VDD5PX, the contactless voltage VDDU and the first driving voltage VDD5P to output a selection signal SS, to the multiplexer 343, which indicates a selected voltage having the highest voltage level from among the contact voltage VDD5PX, the contactless voltage VDDU and the first driving voltage VDD5P.

The multiplexer 343 may output the one having the greatest voltage level from among the contact voltage VDD5PX, the contactless voltage VDDU and the first driving voltage VDD5P as the control voltage VDMAX in response to the selection signal SS.

Figure 10:
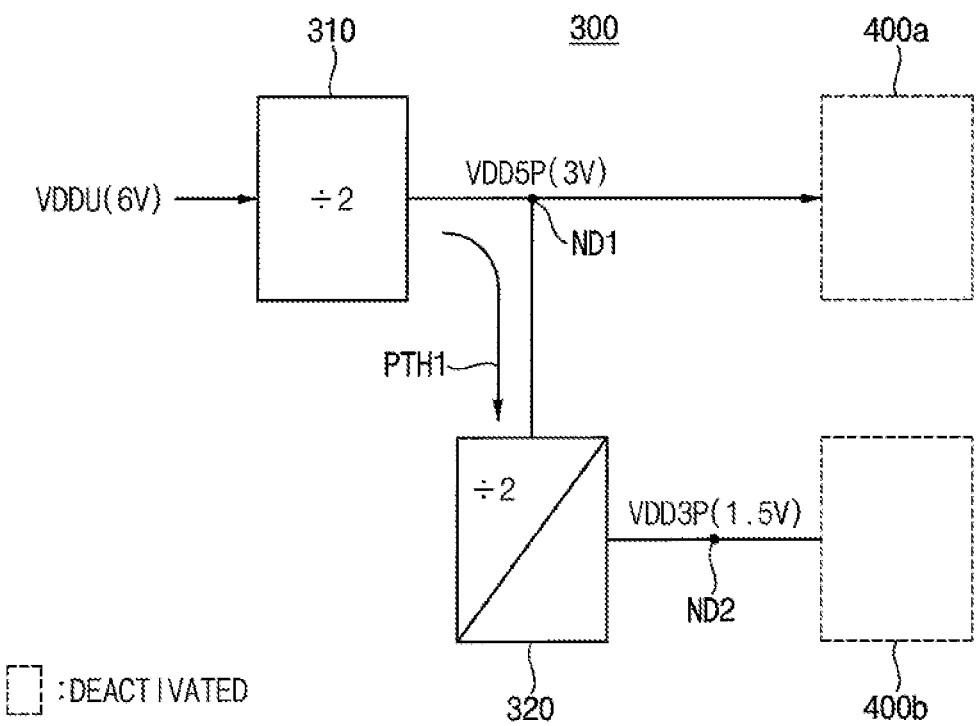
FIG. 10 illustrates a portion of the internal voltage generation circuit of FIG. 4 in the contactless mode.
Figure 11:
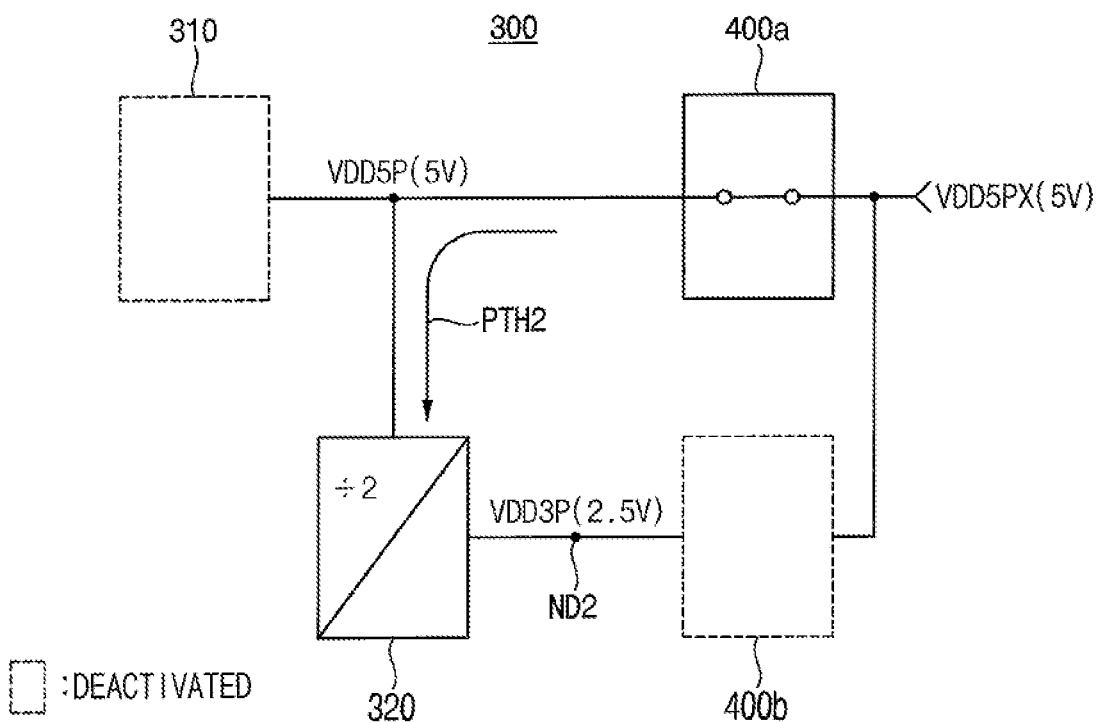
FIGS. 11, 12 and 13 each illustrate a portion of the internal voltage generation circuit of FIG. 4 in the contact mode.
Figure 12:
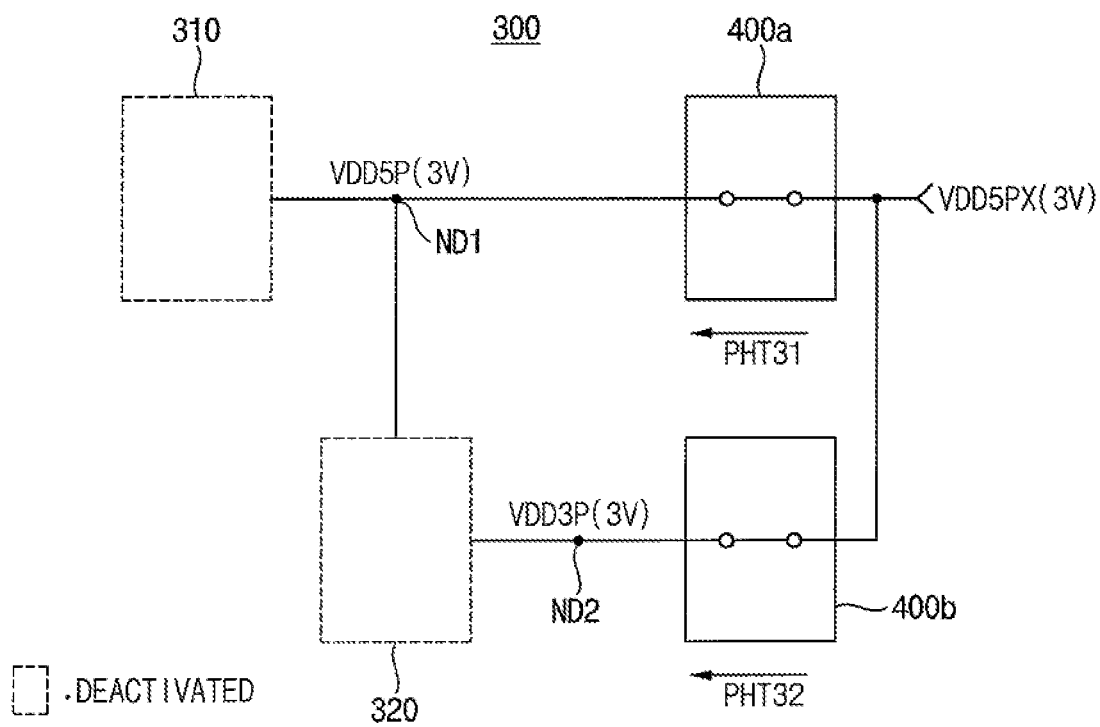
Figure 13:
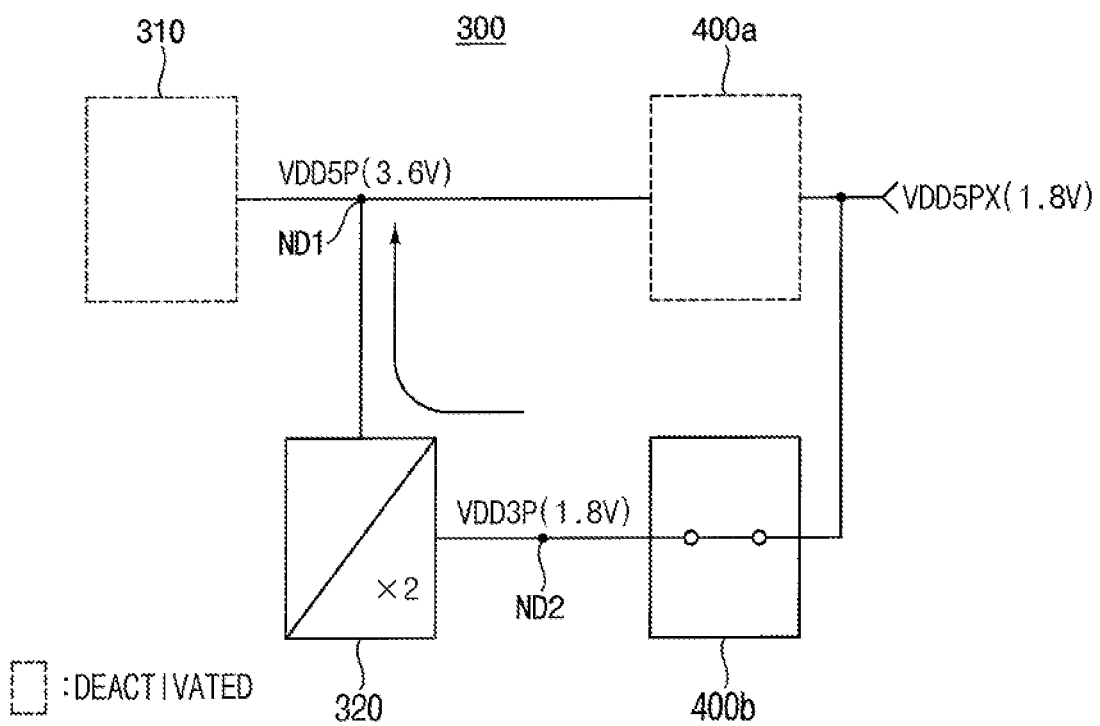

FIG. 10 illustrates a portion of the internal voltage generation circuit of FIG. 4 in the contactless mode and each of FIGS. 11 through 13 illustrates a portion of the internal voltage generation circuit of FIG. 4 in the contact mode according to respective examples.

In FIGS. 10 through 13, the SC converter 310, the bidirectional SC converter 320, the first contact switch 400a and the second contact switch 400b in the internal voltage generation circuit 300 of FIG. 4 are illustrated for convenience of explanation.

Referring to FIGS. 4 and 10, the control signal generator 350 may disable the first contact switch 400a and the second contact switch 400b, respectively, by using the first switching enable signal SW_EN1 and the second switching enable signal SW_EN2, in response to the first mode signal MDS1 in the contactless mode.

The SC converter 310 may be enabled in response to the first power-down signal PD1, and may lower the contactless voltage having VDDU a first voltage level (about 6V) to output the first driving voltage VDD5P having a second, smaller voltage level (about 3V) to the first node ND1.

The bidirectional SC converter 320 may receive the first driving voltage VDD5P through a first path PTH1, may lower the first driving voltage VDD5P to output the second driving voltage VDD3P having a third voltage level (about 1.5V) to the second node ND2. The third voltage level is smaller than the second voltage level.

Referring to FIGS. 4 and 11, in a first sub mode in the contact mode, the control signal generator 350 may disable the SC converter 310 and the second contact switch 400b, by using the first power-down signal PD1 and the second switching enable signal SW_EN2, respectively, in response to the first mode signal and the second mode signal MDS2.

The first contact switch 400a may switch the contact voltage VDD5PX having a first voltage level (about 5V) to the first node ND1 as the first driving voltage VDD5P. The bidirectional SC converter 320 may be enabled in response to the second power-down signal PD2, may receive the first driving voltage VDD5P through a path PTH2 and may lower the first driving voltage VDD5P having a first level (about 5V) to output the second driving voltage VDD3P having a second, smaller voltage level (about 2.5V) to the second node ND2.

The internal voltage generation circuit 300 may generate the first driving voltage VDD5P having a first level (about 5V) and the second driving voltage VDD3P having a second voltage level (about 2.5V) in the first sub-mode of the contact mode.

Referring to FIGS. 4 and 12, in a second sub mode in the contact mode, the control signal generator 350 may disable the SC converter 310 and the bidirectional SC converter 320, respectively, by using the first power-down signal PD1 and the second power-down signal PD2, in response to the first mode signal MDS1 and the second mode signal MDS2.

The first contact switch 400a may switch the contact voltage VDD5PX having a first voltage level (about 3V) to the first node ND1 as the first driving voltage VDD5P. The second contact switch 400b may switch the contact voltage VDD5PX having a first voltage level (about 3V) to the second node ND2 as the second driving voltage VDD3P.

The internal voltage generation circuit 300 may generate the first driving voltage VDD5P having about 3V and the second driving voltage VDD3P having about 3V in the second sub-mode of the contact mode.

Referring to FIGS. 4 and 13, in a third sub mode in the contact mode, the control signal generator 350 may disable the SC converter 310 and the first contact switch 400a, respectively, by using the first power-down signal PD1 and the first switching enable signal SW_EN1, in response to the first mode signal MDS1 and the second mode signal MDS2.

The second contact switch 400b may switch the contact voltage VDD5PX having a first voltage level (about 1.8V) to the second node ND2 as the second driving voltage VDD3P.

The bidirectional SC converter 320 may be enabled in response to the second power-down signal PD2, may boost the second driving voltage VDD3P having a first voltage level (about 1.8V) to output the first driving voltage VDD5P having a second voltage level (about 3.6V) to the first node ND1 through a path PTH3, the second voltage level is greater than the first voltage level.

That is, the internal voltage generation circuit 300 may generate the first driving voltage VDD5P having about 3.6V and the second driving voltage VDD3P having about 1.8V in the third sub-mode of the contact mode.

The internal voltage generation circuit 300 according to example embodiments includes the first contact switch 400a, the second contact switch 400b and the bidirectional SC converter 320 and may generate the second driving voltage VDD3P used for operating the logic circuit block 295 and the first driving voltage VDD5P used for operating the fingerprint recognition sensor 270 and the LEDs 295 even when a level of the contact voltage VDD5PX varies based on a class of the card reader 20.

Figure 14:
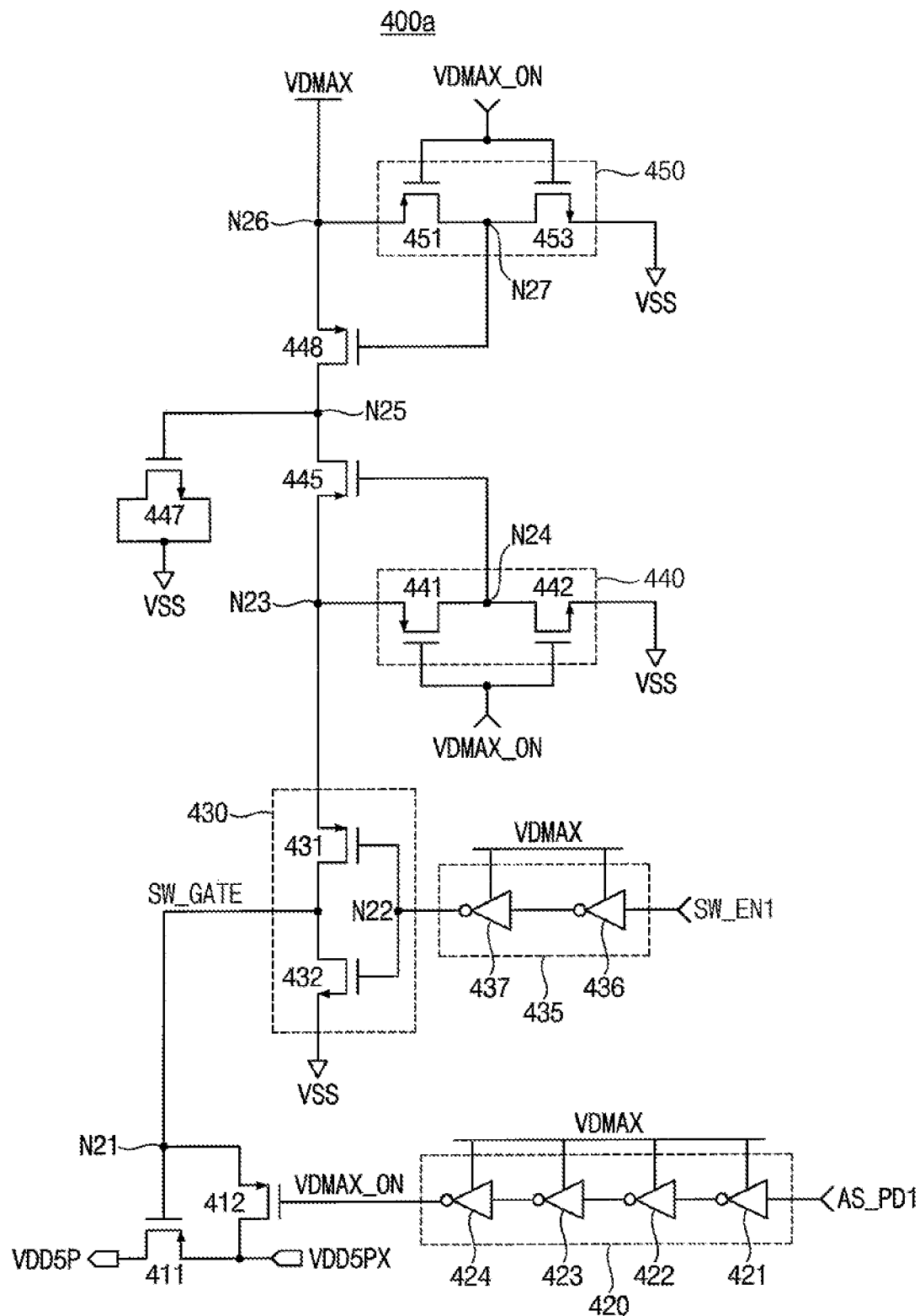
FIG. 14 is a circuit diagram illustrating an example of the first contact switch in the internal voltage generation circuit of FIG. 4 according to example embodiments.

FIG. 14 is a circuit diagram illustrating an example of the first contact switch in the internal voltage generation circuit of FIG. 4 according to example embodiments.

Referring to FIG. 14, the first contact switch 400a may include a main switch 411 including a first p-channel metal-oxide semiconductor (PMOS), an assist switch 412 including a second PMOS transistor, a first delay circuit 420, a second delay circuit 435, a second inverter 430, a third inverter 440, a third PMOS transistor 445, an n-channel metal-oxide semiconductor (NMOS) capacitor 447, a fourth PMOS transistor 448 and a fourth inverter 450.

The main switch 411 includes a first PMOS transistor that has a source coupled to the contact terminal 63 providing the contact voltage VDD5PX and a drain coupled to the first node (outputting the first driving voltage VDD5P, ND1 in FIGS. 11 through 14). The assist switch 412 may include a second PMOS transistor which has a source coupled to a gate of the main switch 411 at a first internal node N21, a drain coupled to the contact voltage VDD5PX and a gate receiving an on-voltage VDMAX_ON associated with generating the control voltage VDMAX. A first ratio associated with a channel width over a channel length of the main switch 411 is M-times greater than a second ratio associated with a channel width over a channel length of the assist switch 412, and M is an integer greater than one.

The first delay circuit 421 may include a plurality of first inverters 421, 422, 423, 424 which are cascade-connected, and the first delay circuit 421 may operate based on the control voltage VDMAX and may delay an assist switch power-down signal AS_PD1 to generate the on-voltage VDMAX_ON.

The second delay circuit 435, connected to a second internal node N22, may operate based on the control voltage VDMAX and may delay the first switching enable signal SW_EN1 to provide the delayed first switching enable signal to the second internal node N22.

The second inverter 430 may be connected between the first internal node N21, the second internal node N22, a third internal node N23 and the ground voltage VSS and may invert an output of the second delay circuit 435 to provide the inverted output to the first internal node N21. The second inverter 430 may include a PMOS transistor 431 and the NMOS transistor 432. The PMOS transistor 431 is connected between the third internal node N23 and the first internal node N21 and the NMOS transistor 432 is connected between the first internal node N21 and the ground voltage VSS.

The third inverter 440 may be connected between the third internal node N23, a fourth internal node N24 and the ground voltage VSS and may invert the on-voltage VDMAX_ON to provide inverted version of the on-voltage VDMAX_ON to the fourth internal node N24. The third inverter 440 may include a PMOS transistor 441 and the NMOS transistor 442. The PMOS transistor 441 is connected between the third internal node N23 and the fourth internal node N24 and the NMOS transistor 442 is connected between the fourth internal node N24 and the ground voltage VSS.

The third PMOS transistor 445 has a source coupled to the third internal node N23, a gate coupled to the fourth internal node N24 and a drain coupled to a fifth internal node N25. The NMOS capacitor 447 is coupled between the fifth internal node N25 and the ground voltage VSS and may store charges at the fifth internal node N25 therein. The NMOS capacitor 447 has a gate coupled to the fifth internal node N25 and a drain and a source connected to each other.

The fourth PMOS transistor 448 has a drain coupled to the fifth internal node N25, a source coupled to a sixth internal node N26 connected to the control voltage VDMAX and a gate coupled to a seventh internal node N27.

The fourth inverter 450 may be connected between the sixth internal node N26, the seventh internal node N27 and the ground voltage VSS and may invert the on-voltage VDMAX_ON to provide inverted version of the on-voltage VDMAX_ON to the seventh internal node N27. The fourth inverter 450 may include a PMOS transistor 451 and the NMOS transistor 452. The PMOS transistor 451 is connected between the sixth internal node N26 and the seventh internal node N27 and the NMOS transistor 452 is connected between the seventh internal node N27 and the ground voltage VSS.

A ratio associated with a channel width over a cannel length of the PMOS transistor 451 is N-times greater than a ratio associated with a channel width over a cannel length of the fourth PMOS transistor 448, and N is an integer greater than one. A ratio associated with a channel width over a cannel length of the NMOS capacitor 447 is P times greater than a ratio associated with a channel width over a cannel length of the PMOS transistor 451, and P is an integer greater than ten.

Figure 15:
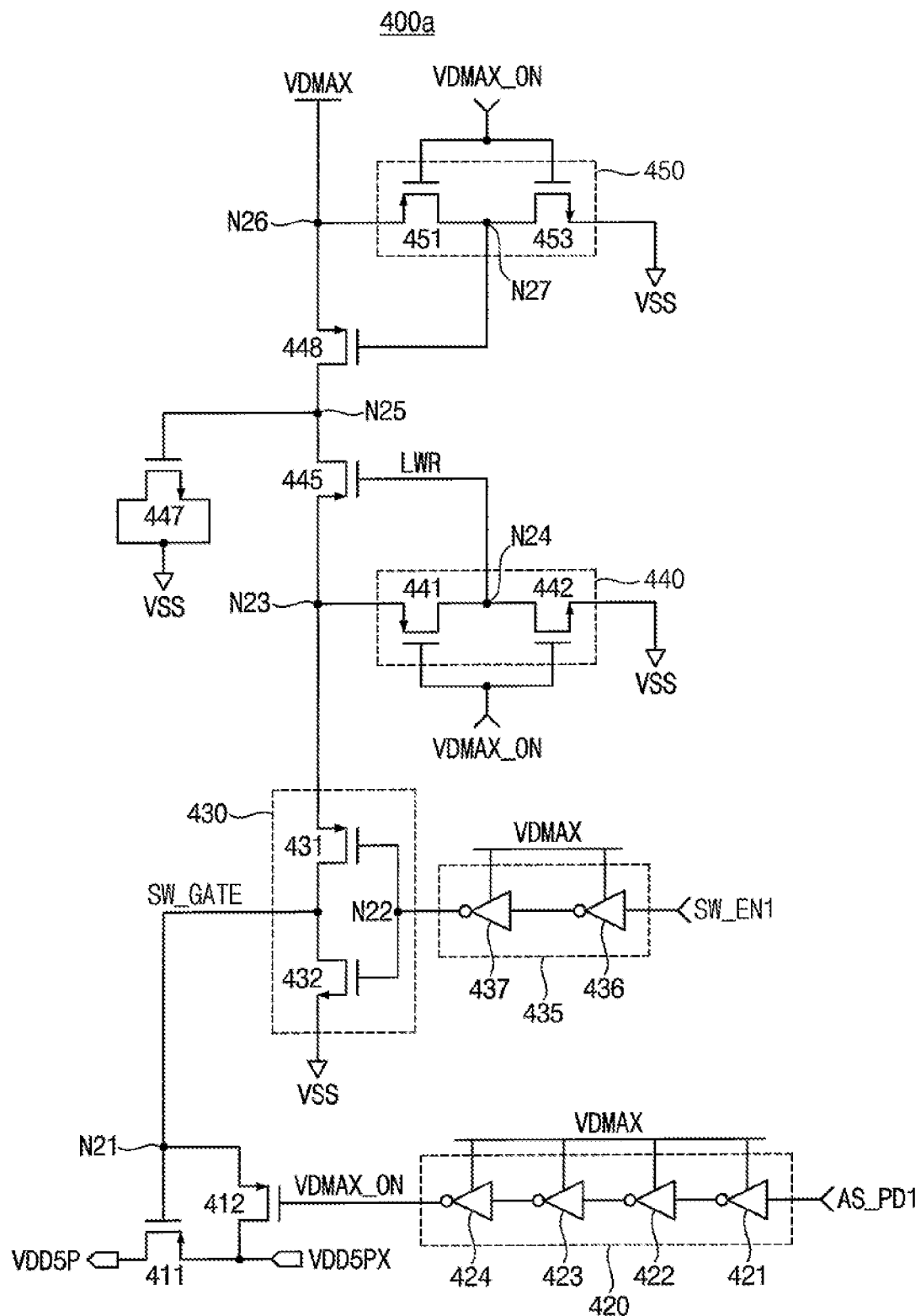
FIG. 15 illustrates the first contact switch of FIG. 14 in the contact mode.
Figure 16:
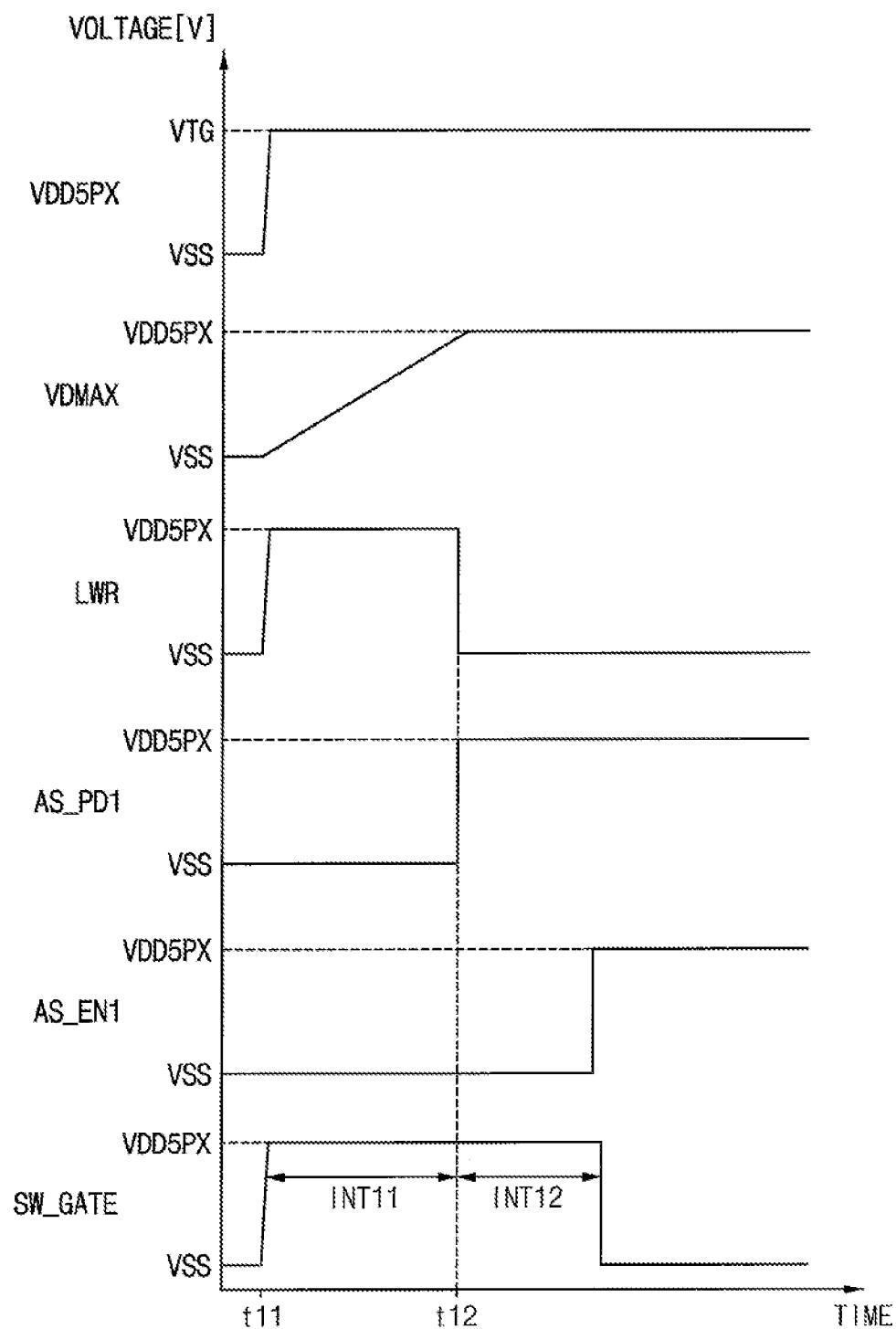
FIG. 16 is a timing diagram illustrating an operation of the first contact switch of FIG. 14 in the contact mode.

FIG. 15 illustrates the first contact switch of FIG. 14 in the contact mode and FIG. 16 is a timing diagram illustrating an operation of the first contact switch of FIG. 14 in the contact mode.

In FIG. 16, it is assumed that, in the contact mode, the contact voltage VDD5PX is applied to the source of the main switch 411 at t11, the mode selector 330 in FIG. 4 generates the control voltage VDMAX at t12, a level of the assist switch power-down signal AS_PD1 is maintained at a low level VSS until t12 and transitions to a high level VDD5PX at t12 and the first switching enable signal SW_EN1 transitions to a high level VDD5PX at t13.

Referring to FIGS. 15 and 16, the contact voltage VDD5PX is applied to the source of the main switch 411 at t11 and the source of the main switch 411 arrives at a target level VTG. At t11, since the assist switch power-down signal AS_PD1 is at a low level, the on-voltage VDMAX_ON, output of the first delay circuit 420 has a low level. Therefore, the assist switch 412 is turned-on the on-voltage VDMAX_ON and the contact voltage VDD5PX is applied to the gate of the main switch 411.

During a first interval INT11 from t11 and t12, since the on-voltage VDMAX_ON has a low level, the third inverter 440 inverts the on-voltage VDMAX_ON to provide a voltage LWR having a high level to the fourth internal node N24 and the fourth inverter 450 inverts the on-voltage VDMAX_ON to provide a voltage having a high level to the seventh internal node N27. The third PMOS transistor 445 and the fourth PMOS 448 are turned-off in response to the on-voltage VDMAX_ON, charges at the fifth internal node N25 are stored in the NMOS 447 capacitor 447.

At t12, the on-voltage VDMAX_ON transitions to a high level in response to the assist switch power-down signal AS_PD1 transitioning to a high level. The assist switch 412 is turned-off, the fourth PMOS transistor 448 is turned-on, and the third PMOS transistor 445 is turned-on in response to the on-voltage VDMAX_ON having a high level. The PMOS transistor 431 is turned-on in response to the first switching enable signal SW_EN1. Therefore, a current path from the sixth internal node N26 to the first internal node N21 is provided and a gate voltage SW_GATE of the main switch 411 is maintained with a high level between t12 and t13.

The main switch 411 is turned-on/off by the first switching enable signal SW_EN1 after t12.

The gate voltage SW_GATE of the main switch 411 is maintained with a high level by the contact voltage VDD5PX during the first interval INT11 and is maintained with a high level by the control voltage VDMAX during a second interval INT12 between t12 and t13.

The assist switch 412 may be turned-on in response to the on-voltage VDMAX_ON before the control voltage VDMAX is generated based on the contact voltage VDD5PX and may prevent overcurrent flowing into the main switch 411. If the assist switch 412 is not included in the first contact switch 412, overcurrent, generated by the contact voltage VDD5PX, flowing into the main switch 411 may be provided to the first node ND1 before the control voltage VDMAX is generated. When the overcurrent is provided to the first node ND1, components operating based on the second driving voltage VDD3P may be damaged.

Figure 17:
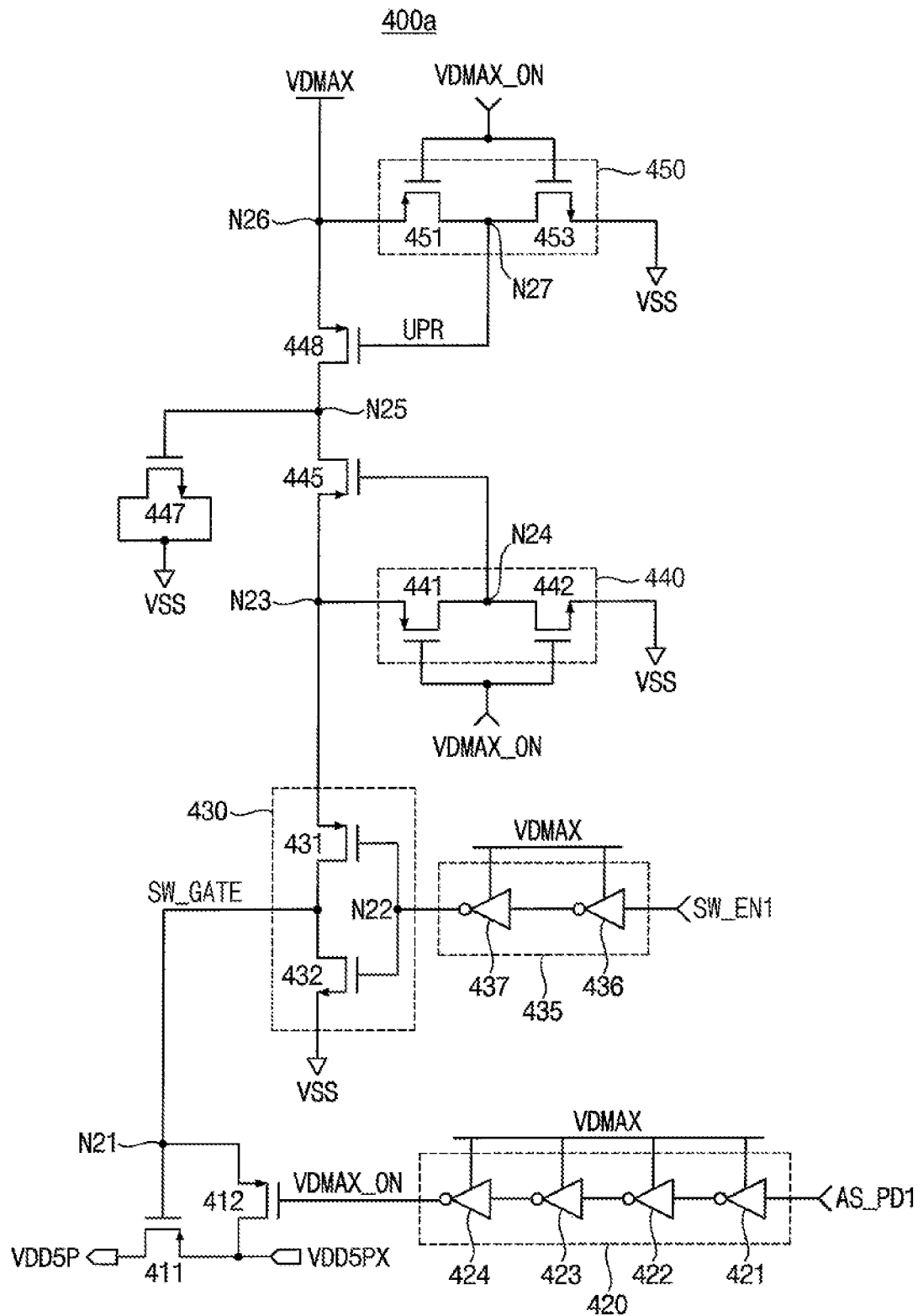
FIG. 17 illustrates the first contact switch of FIG. 14 in the contactless mode.
Figure 18:
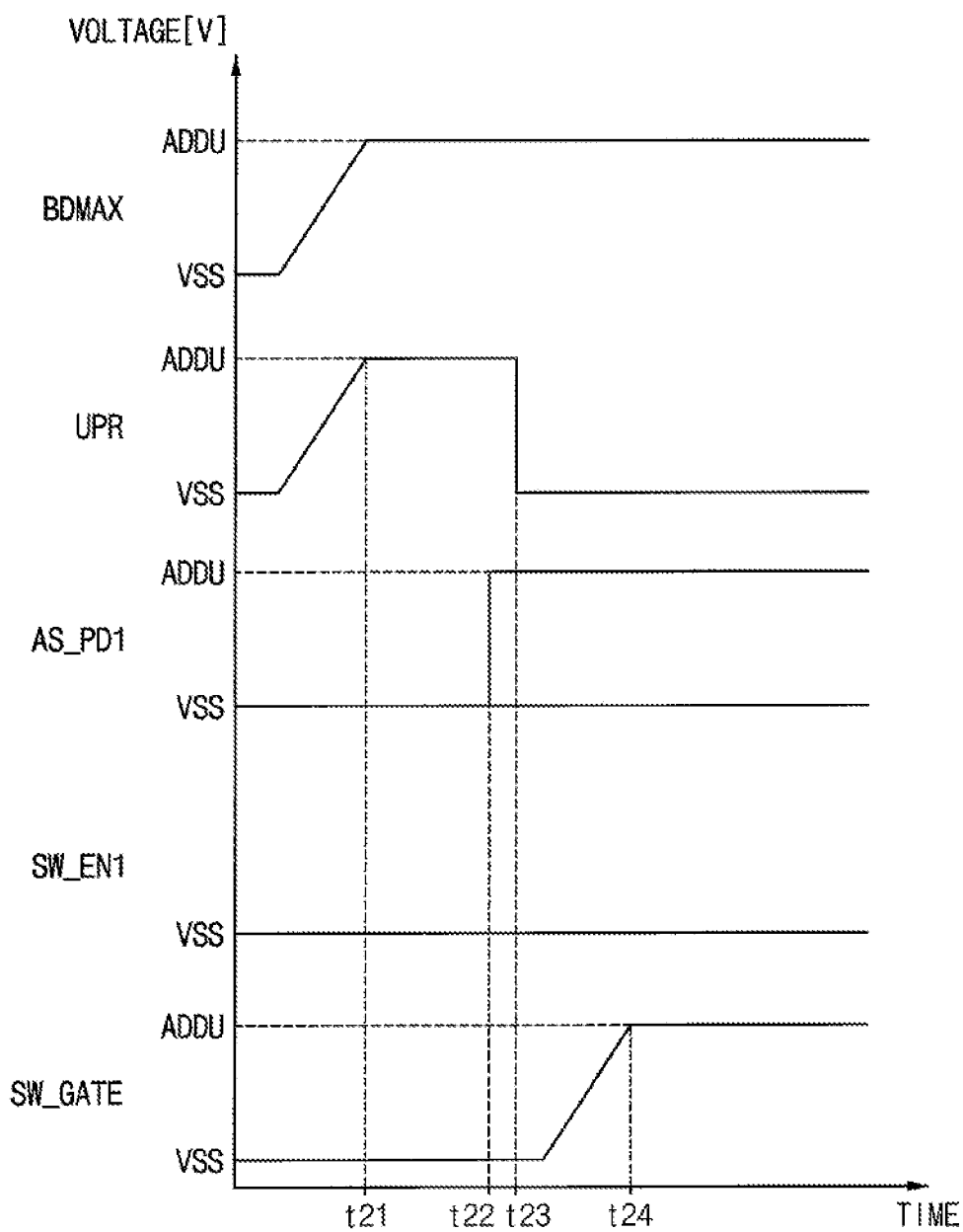
FIG. 18 is a timing diagram illustrating an operation of the first contact switch of FIG. 14 in the contactless mode.

FIG. 17 illustrates the first contact switch of FIG. 14 in the contactless mode and FIG. 18 is a timing diagram illustrating an operation of the first contact switch of FIG. 14 in the contactless mode.

In FIG. 18, it is assumed that, in the contactless mode, the contactless voltage VDDU is applied to the SC converter 310 in FIG. 4 at t21, the mode selector 330 in FIG. 4 generates the control voltage VDMAX at t22, a level of the assist switch power-down signal AS_PD1 is maintained at a low level VSS until t23 and transitions to a high level VDD5PX at t23 and the first switching enable signal SW_EN1 is maintained with a low level.

Referring to FIGS. 17 and 18 the contactless voltage VDDU is applied to the SC converter 310 in FIG. 4 at t21 and the control voltage VDMAX arrives at a high level at t22. The on-voltage VDMAX_ON, output of the first delay circuit 420, transitions to a high level in response to the control voltage VDMAX transitioning to a high level and the assist switch power-down signal AS_PD1. A gate voltage UPR of the fourth PMOS transistor 448 increases from t21 and arrives at a high level at t22 in response to the on-voltage VDMAX_ON transitioning.

When the assist switch power-down signal AS_PD1 transitions to a high level at t23, the gate voltage UPR of the fourth PMOS transistor 448 transitions to a low level at t21 in response to the assist switch power-down signal AS_PD1 transitioning to a high level.

Therefore, the gate voltage SW_GATE of the main switch 411 is maintained with a low level until t24, increases from t21 in response to the assist switch power-down signal AS_PD1 transitioning to a high level and the on-voltage VDMAX_ON transitioning to a high level and arrives at a high level at t25.

Configuration and operation of the first contact switch 400a in FIG. 4 are described with reference to FIGS. 14 through 18. Configuration and operation of the second contact switch 400b in FIG. 4 may be substantially similar with configuration and operation of the first contact switch 400a, respectively.

In this case, in the second contact switch 400b, the main switch 411 is connected to the second node ND2 instead of the first node ND1, a second assist switch power-down signal instead of the assist switch power-down signal AS_PD1 is applied to the first delay circuit 420 and a second switching enable signal SW_EN2 instead of the first switching enable signal SW_EN1 is applied to the second delay circuit 435.

In general, the smart cards or the IC cards are of a shape such that a thin semiconductor device is attached to a plastic card of the same size as a credit card. The smart cards can be roughly classified as a contact IC card, a contactless IC Card (CICC), and a Remote Coupling Communication Card (RCCC). In connection with the CICC, ISO (the International Organization for Standardization) and IEC (the International Electrotechnical Commission) have formed a specialized system for worldwide standardization.

Particularly international standard ISO/IEC 14443 specifies the physical characteristics of proximity cards, radio frequency power and signal interface, initialization and anti-collision, and transmission protocol. Under ISO/IEC 14443, the contactless IC cards incorporate an integrated circuit (IC) that performs data processing and/or memory functionality. The possibility of contactless card technology is a result of the achievement of signal exchange via inductive coupling with a proximity coupling device (that is, a card reader) and to ability to supply power to the card without the use of galvanic elements (i.e., the absence of an ohmic path from the external interfacing equipment to the integrated circuit(s) contained within the card). A card reader produces an energizing radio frequency (RF) field which is coupled to the card in order to transfer power and which is modulated for communication. The carrier frequency fc of the RF operating field is 13.56 MHz+7 kHZ.

Figure 19:
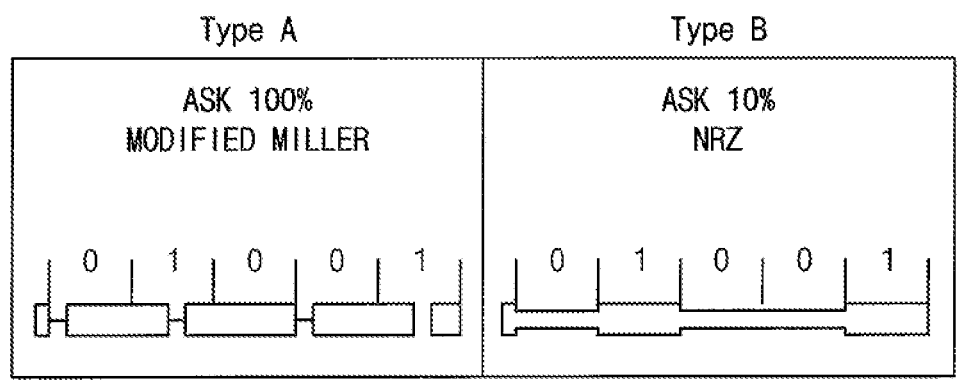
FIGS. 19 and 20 are diagrams illustrating examples of communication signals for a type A interface of ISO/IEC 14442 standards.
Figure 20:
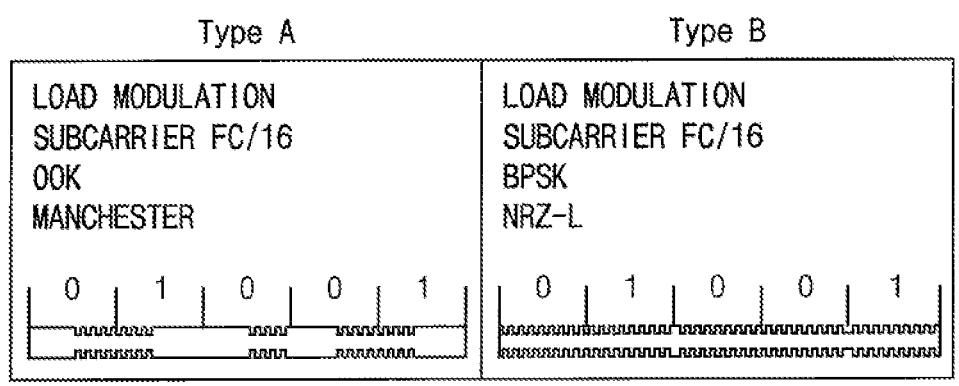
Figures 21, 22:
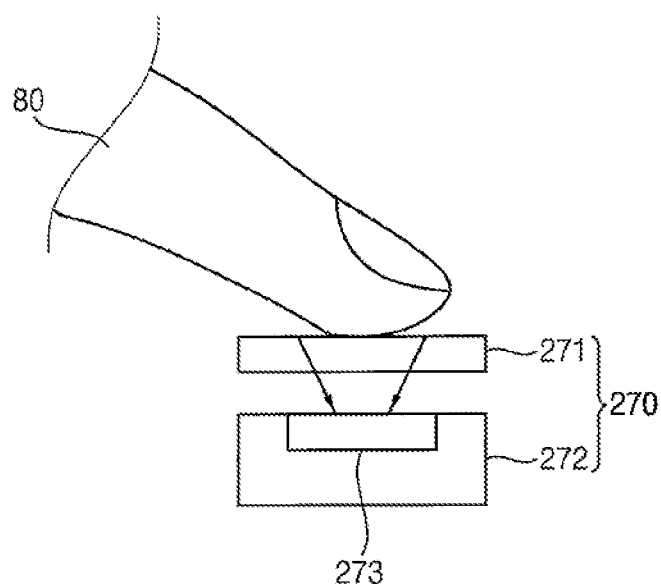
FIG. 21 is a diagram illustrating an example of frames and pauses of the type A interface of ISO/IEC 14442 standards.
FIG. 22 illustrates an example of the fingerprint recognition sensor in the smart card chip in FIG. 2 according to example embodiments.

FIGS. 19 and 20 are diagrams illustrating examples of communication signals for a type A interface of ISO/IEC 14442 standards, and FIG. 21 is a diagram illustrating an example of frames and pauses of the type A interface of ISO/IEC 14442 standards.

FIG. 19 illustrates a signal transferred from a card reader to a contactless IC card and FIG. 20 illustrates a signal transferred from the contactless IC card to the card reader.

The ISO/IEC 14443 protocol describes two communication signal interfaces, Type A and Type B. Under the communication signal interface Type A, communication from a card reader to a contactless smart card utilizes the modulation principle of ASK 100% of the RF operating field and a Modified Miller code principle. The bit rate for the transmission from the card reader to the contactless smart card is fc/128, that is, 106 kbps (kb/s). Transmission from the contactless smart card to the card reader is coded by the Manchester code principle and then modulated by the On-Off Key (OOK) principle. Presently, cards that are managed by the communication signal interface of Type A in subways and buses, generate timing of a constant interval of time using an ASK-modulated signal received from a card reader, and receive and transmit data one bit at a time.

When data is transferred from a smart card to a card reader, power is stably provided to the smart card from the card reader.

FIG. 21 illustrates Type A data frames of ISO/IEC 14443 standards. FIG. 21 shows a short frame including a start bit S, data bits b1~B7 and an end bit E.

FIG. 22 illustrates an example of the fingerprint recognition sensor 270 in the smart card chip in FIG. 2 according to example embodiments. In this example, the fingerprint recognition sensor 270 may include a lens 271 and an image sensor 272, and the image sensor 272 may include a pixel array 273.

The lens 271 may concentrate reflected light from a user's finger 80 on the pixel array 272 of the image sensor 272. The image sensor 272 may generate a fingerprint image signal based on the reflected light and may provide the fingerprint image signal to the processor 240 in FIG. 2.

The processor 240 may compare the fingerprint image signal with the user's original fingerprint and may determine whether the user's input fingerprint matches the original based on a result of the comparison. When the processor 240 determines that the user's input fingerprint matches the user's original fingerprint, the processor 240 may indicate that the user authentication is passed by controlling the LEDs 295 to emit light while performing the user authentication on the payment data associated with the payment operation.

Figure 23:
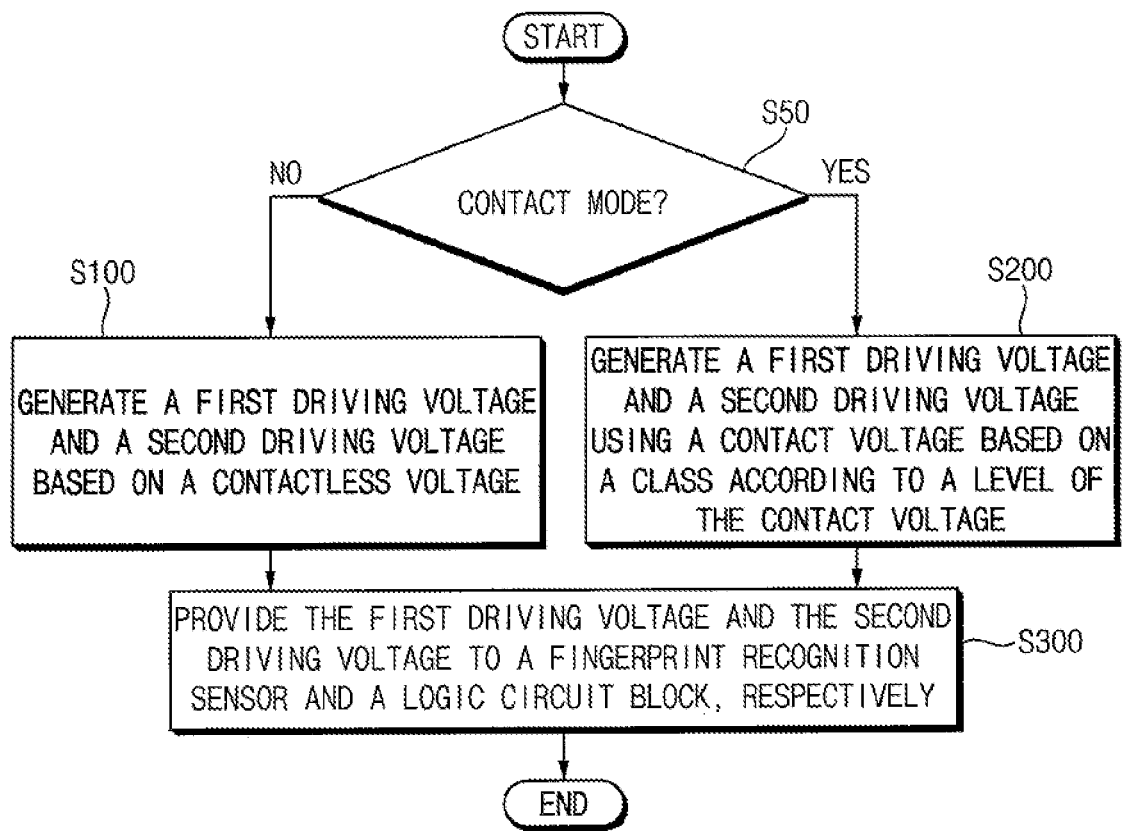
FIG. 23 is a flow chart illustrating a method of operating a smart card according to example embodiments.

FIG. 23 is a flow chart illustrating a method of operating a smart card according to example embodiments. Referring to FIG. 2 through 23, in a method of operating a smart to perform fingerprint authentication, the IVGC 300 determines whether the smart card 50 operates in a contactless mode (operation S20). The IVGC 300 in the smart card 50 may determine whether card reader 20 supplies the contactless voltage VDDU or the contactless voltage VDD5PX and may determine whether the smart card 50 operates in a contactless mode.

When it is determined that the smart card 50 operates in a contactless mode (YES in operation S20), the IVGC 300 may generate the first driving voltage VDD5P and the second driving voltage VDD3P whose level is smaller than a level of the first driving voltage VDD5P based on the contactless voltage VDDU (operation S100). The contactless voltage VDDU may have a voltage level about 6V, the first driving voltage VDD5P may have a voltage level about 3V and the second driving voltage VDD3P may have a voltage level about 1.5V.

The IVGC 300 may provide the second driving voltage VDD3P to the logic circuit block 295 and may provide the first driving voltage VDD5P to the fingerprint recognition sensor 270.

When it is determined that the smart card 50 operates in a contact mode (NO in operation S20), the IVGC 300 may generate the first driving voltage VDD5P and the second driving voltage VDD3P based on a class of the card reader 20 according to a level of the contact voltage VDD5PX (operation S200).

The IVGC 300 may provide the second driving voltage VDD3P to the logic circuit block 295 and may provide the first driving voltage VDD5P to the fingerprint recognition sensor 270.

Figure 24:
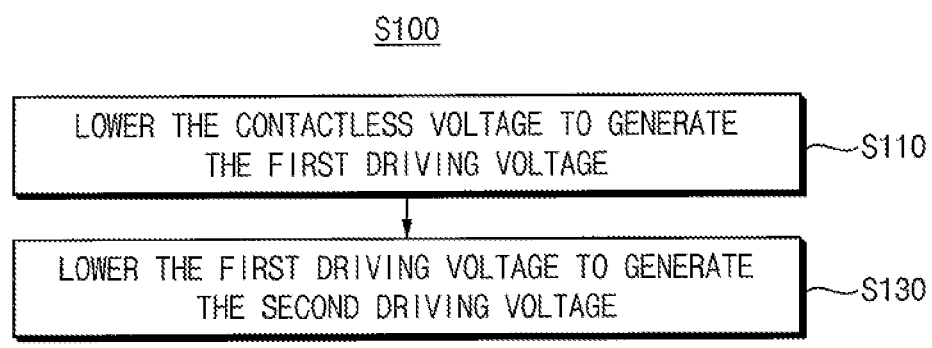
FIG. 24 is a flow chart illustrating an operation of generating a first driving voltage and a second driving voltage in the contactless mode in FIG. 23.

FIG. 24 is a flow chart illustrating an operation of generating a first driving voltage and a second driving voltage in the contactless mode in FIG. 23.

Referring to FIG. 2 through 24, for generating the first driving voltage VDD5P and the second driving voltage VDD3P based on the contactless voltage VDDU (operation S100), the SC converter 310 in the IVGC 300 lowers (step-down) the contactless voltage having VDDU to generate the first driving voltage VDD5P (operation S110). The bidirectional SC converter 320 in the IVGC 300 lowers the first driving voltage VDD5P to generate the second driving voltage (operation S130).

Figure 25:
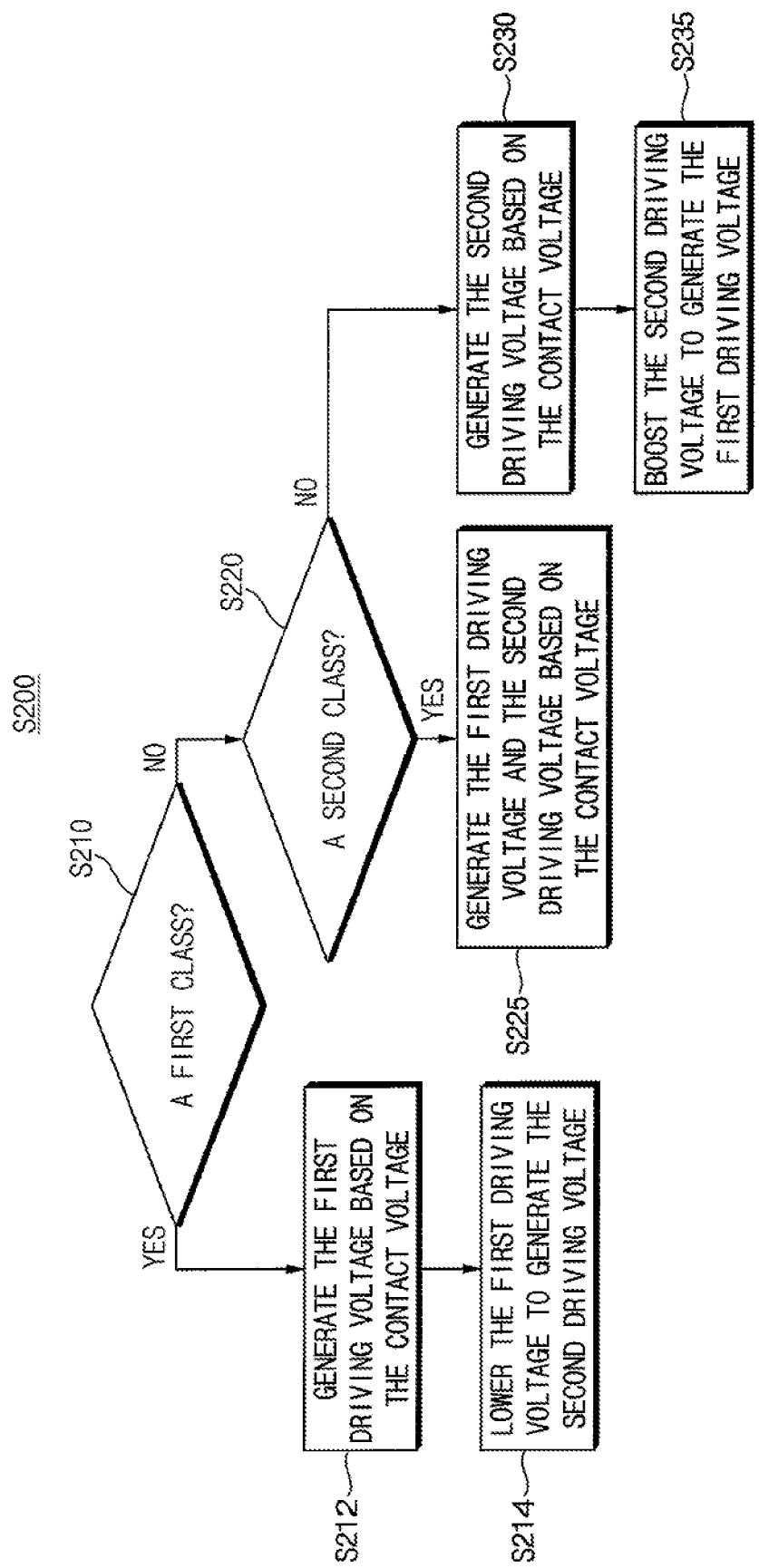
FIG. 25 is a flow chart illustrating an operation of generating a first driving voltage and a second driving voltage in the contact mode in FIG. 23.

FIG. 25 is a flow chart illustrating an operation of generating a first driving voltage and a second driving voltage in the contact mode in FIG. 23.

Referring to FIGS. 2 through 23 and 25, for generating the first driving voltage VDD5P and the second driving voltage VDD3P based on the contact voltage VDD5PX (operation S200), the mode selector 330 in the IVGC 300 determines whether the card reader 20 or the contact voltage VDD5PX corresponds to a first class (operation S210). The mode selector 330 may determine that the card reader 20 corresponds to the first class when the contact voltage VDD5PX is greater than the first reference voltage VREF1.

When it is determined that the card reader 20 corresponds to the first class (YES in operation S210), the first contact switch 400a generates first driving voltage VDD5P based on the contact voltage VDD5PX (operation S212). having a first voltage level (about 5V) to the first node ND1 as the first driving voltage VDD5P. The first contact switch 400a may switch the contact voltage VDD5PX to generate the first driving voltage VDD5P. The bidirectional SC converter 320 lowers the first driving voltage VDD5P to generate the second driving voltage VDD3P (operation S214). In this case, the first driving voltage VDD5P may have a voltage level about 5V and the second driving voltage VDD3P may have a voltage level about 2.5V.

When it is determined that the card reader 20 does not correspond to the first class (NO in operation S210), the mode selector 330 in determines whether the card reader 20 or the contact voltage VDD5PX corresponds to a second class (operation S220). The mode selector 330 may determine that the card reader 20 corresponds to the second class when the contact voltage VDD5PX is smaller than the first reference voltage VREF1 and greater than the second reference voltage VREF2.

When it is determined that the card reader 20 corresponds to the second class (YES in operation S220), IVGC 300 generates the first driving voltage VDD5P and the second driving voltage VDD3P based on the contact voltage VDD5PX (S225). The first contact switch 400a may switch the contact voltage VDD5PX to generate the first driving voltage VDD5P. The second contact switch 400b may switch the contact voltage VDD5PX to generate the second driving voltage VDD3P. In this case, the first driving voltage VDD5P may have a voltage level about 3V and the second driving voltage VDD3P may have a voltage level about 1.5V.

When it is determined that the card reader 20 does not correspond to the second class (NO in operation S220), the mode selector 330 in determines whether the card reader 20 or the contact voltage VDD5PX corresponds to a third class. The mode selector 330 may determine that the card reader 20 corresponds to the third class when the contact voltage VDD5PX is smaller than the second reference voltage VREF2.

When it is determined that the card reader 20 corresponds to the third class, the second contact switch 400b generates second driving voltage VDD3P based on the contact voltage VDD5PX (operation S230). The second contact switch 400b may switch the contact voltage VDD5PX to generate second driving voltage VDD3P.

The bidirectional SC converter 320 boosts the second driving voltage VDD3P to generate the first driving voltage VDD5P (operation S235). In this case, the contact voltage VDD5PX may have a voltage level about 1.8V, the second driving voltage VDD3P may have a voltage level about 1.8V and the first driving voltage VDD5P may have a voltage level about 3.6V.

Therefore, according to a method of operating the smart card. the first contact switch 400a, the second contact switch 400b and the bidirectional SC converter 320 and may generate the second driving voltage VDD3P used for operating the logic circuit block 295 and the first driving voltage VDD5P used for operating the fingerprint recognition sensor 270 and the LEDs 295 even when a level of the contact voltage VDD5PX varies based on a class of the card reader 20.

Figure 26:
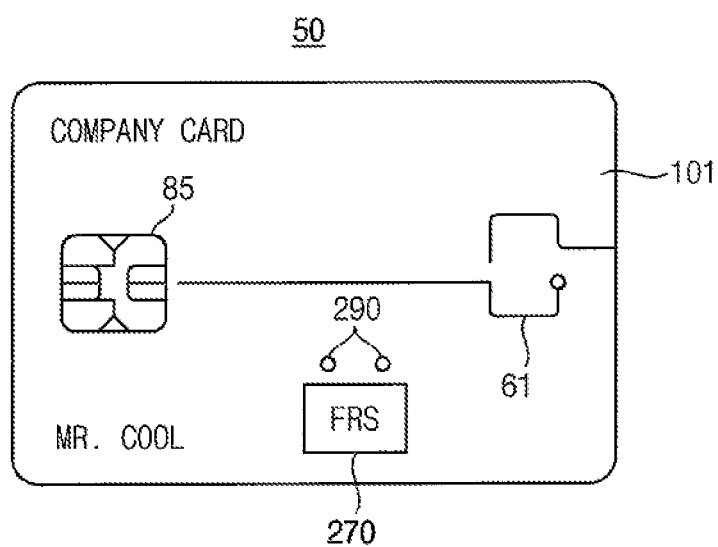
FIG. 26 illustrates an example of the smart card according to example embodiments.

FIG. 26 illustrates an example of the smart card according to example embodiments. Referring to FIG. 26, the smart card 50 may include an integrated circuit 85, an antenna 61, the fingerprint recognition sensor 270 and the LEDs 290 formed in a substrate 101.

The antenna 61 may be coupled to the integrated circuit 85. The integrated circuit 85 may include components among from components of the smart card chip 100 in FIG. 2 except the fingerprint recognition sensor 270 and the LEDs 290, and the contact terminal 63 in FIG. 1 may be included in the integrated circuit 85.

The antenna 61 receives a contactless voltage from the card reader 20 in the contactless mode to provide the contactless voltage to an internal voltage generation circuit 300 in the integrated circuit 85. The contact terminal in the integrated circuit 85 receives a contact voltage from the card reader 20 in the contact mode to provide the contact voltage to the internal voltage generation circuit in the integrated circuit 85

The fingerprint recognition sensor 270 may generate a fingerprint image signal based on user's input fingerprint in a payment operation during the contactless mode and/or the contact mode, and may provide the fingerprint image signal to the processor 240. The processor 240 may compare the fingerprint image signal with the user's original fingerprint and may determine whether the user's input fingerprint does not match the user's original fingerprint (e.g., the input fingerprint is faked) based on a result of the comparison. When the processor 240 determines that the user's input fingerprint matches the user's original fingerprint, the processor 240 may indicate that the user authentication is passed by controlling the LEDs 295 to emit light while performing the user authentication on the payment data associated with the payment operation. When the processor 240 determines that the user's input fingerprint does not match the user's original fingerprint, the processor 240 may indicate that the input fingerprint does not match the user's original fingerprint through the LEDs 295.

Figure 27:
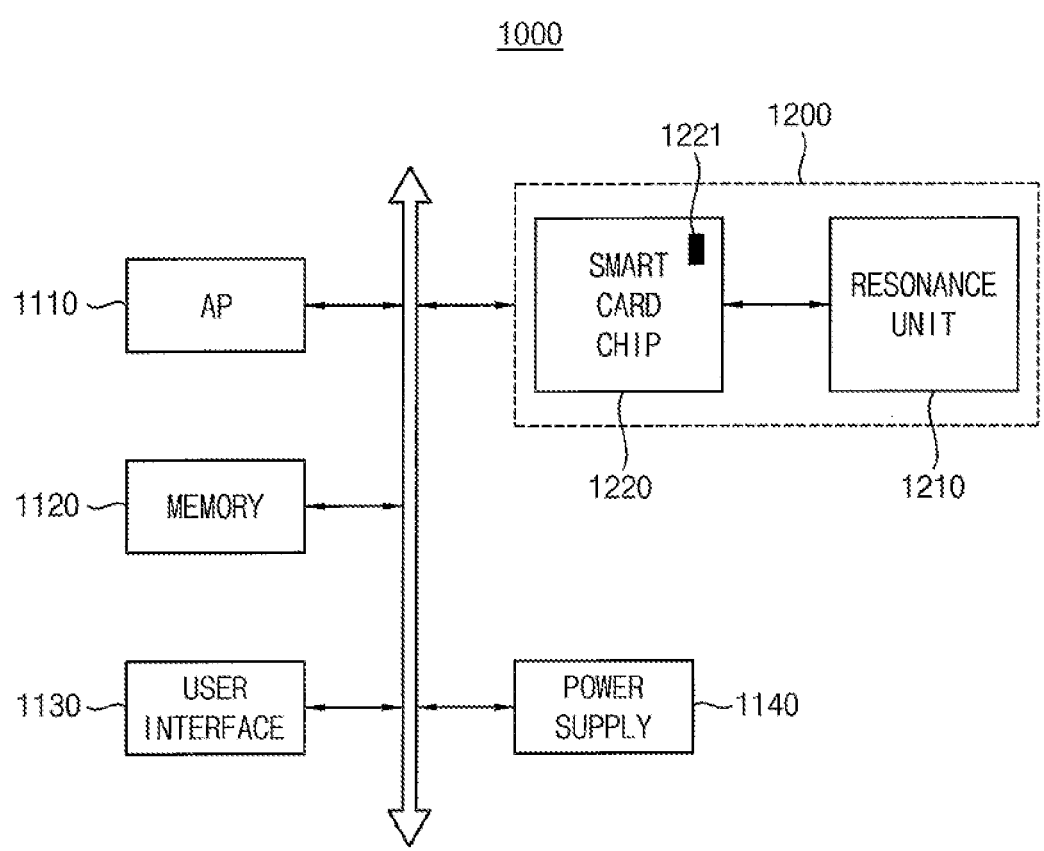
FIG. 27 is a block diagram illustrating an electronic device according to example embodiments.

FIG. 27 is a block diagram illustrating an electronic device, 1000, according to example embodiments. The electronic device 1000 includes an application processor 1110, a smart card 1200, a memory device 1120, a user interface 1130 and a power supply 1140. In some embodiments, the electronic system 1000 may be a mobile phone, a smart phone, a personal digital assistant (PDA), a portable multimedia player (PMP), a digital camera, a music player, a portable game console, a navigation system, a laptop computer, or the like.

The application processor 1110 may control overall operations of the electronic system 1000. The application processor 1110 may execute applications, such as a web browser, a game application, a video player, etc. In some embodiments, the application processor 1110 may include a single core or multiple cores. For example, the application processor 1110 may be a multi-core processor, such as a dual-core processor, a quad-core processor, a hexa-core processor, etc. The application processor 1110 may include an internal or external cache memory.

The memory device 1120 may store data required for an operation of the electronic system 1000. For example, the memory device 1120 may store a boot image for booting the electronic system 1000, output data to be outputted to an external device and input data received from the external device. For example, the memory device 1120 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM) or a ferroelectric random access memory (FRAM).

The smart card 1200 may include a matching circuit 1210 and a smart card chip 1220 and the smart card chip 1220 includes a connection terminal 1221. The smart card chip 1220 may receive voltage from an external card reader through the matching circuit 1210 in a contactless manner and may exchange data with the external card reader. The smart card chip 1220 may receive voltage from an external card reader through the connection terminal 1221 in a contact manner and may exchange data with the external card reader. The smart card 50 of FIG. 2 is an example of the smart card 1200

Therefore, the smart card 1200 may include an internal voltage generation circuit and the internal voltage generation circuit includes a first contact switch, a second contact switch, a SC converter and a the bidirectional SC converter which generate the second driving voltage used for operating the logic circuit block and the first driving voltage used for operating the fingerprint recognition sensor even when a level of the contact voltage varies based on a class of the card reader.

The user interface 1130 may include at least one input device, such as a keypad or a touch screen, and at least one output device, such as a speaker or a display device. The power supply 1140 may supply a power supply voltage to the electronic system 1000.

In some embodiments, the electronic device 1000 may further include an image processor, and/or a storage device, such as a memory card, a solid state drive (SSD), a hard disk drive (HDD) or a CD-ROM.

In some embodiments, the electronic device 1000 and/or components of the electronic device 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

In the above-described embodiments, the fingerprint sensor processor 240 and the LEDs are each an example of at least one first circuit component (of a smart card) that is driven by a first driving voltage VDD5P that is higher than a second driving voltage VDD3P that drives at least one second circuit component, e.g., the processor 240 and/or the logic circuit block 295. In other embodiments, different circuit components may be substituted for these first and/or second circuit components. Thus, the inventive concept may be generally applied to a smart card that includes first and second circuit components having different optimal driving voltage ranges ("operational voltage ranges"). For example, a midpoint of the second operational voltage range may be different from (e.g., lower than) a midpoint of the second operational voltage range. The first circuit component (the fingerprint sensor or alternative component) may be powered by the first driving voltage VDD5P, which falls within the first optimal voltage range, and the second circuit component (the processor or alternative component) may be powered by the second driving voltage VDD3P, which falls within the second optimal voltage range.

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims and their equivalents.

What is claimed is:

1. An internal voltage generation circuit of a smart card configured to perform a fingerprint authentication, the internal voltage generation circuit comprising:
   a first contact switch configured to selectively switch a contact voltage received from an external card reader to a first node based on a first switching enable signal, in a contact mode;
   a second contact switch configured to selectively switch the contact voltage to a second node based on a second switching enable signal, in the contact mode;
   a switched capacitor converter configured to step down a contactless voltage induced by an electromagnetic wave received from the card reader to provide a contactless mode first driving voltage to the first node;
   a bidirectional switched capacitor converter, connected to the first node and the second node, the bidirectional switched capacitor converter configured to:
   in a contactless mode, step down the contactless mode first driving voltage at the first node to provide a contactless mode second driving voltage to the second node; and
   in the contact mode, either step down a contact mode first driving voltage at the first node to provide a contact mode second driving voltage to the second node, or boost a contact mode second driving voltage at the second node based on a level of the contact voltage to provide a boosted voltage to the first node;
   a mode selector configured to output a first mode signal and a second mode signal, the first mode signal designating one of the contact mode and the contactless mode, the second mode signal designating one of a plurality of sub-modes of the contact mode, the mode selector further configured to select a highest voltage among the contact voltage, the contactless voltage and the contactless mode first driving voltage or the contact mode first driving voltage to output the selected voltage as a control voltage; and
   a control signal generator configured to generate a first power-down signal that enables/disables the switched capacitor converter, a second power-down signal that enables/disables the bidirectional switched capacitor converter, the first switching enable signal and the second switching enable signal, based on the first mode signal and the second mode signal.

2. The internal voltage generation circuit of claim 1, wherein, in the contactless mode,
   the control signal generator is configured to disable the first contact switch and the second contact switch, respectively, by using the first switching enable signal and the second switching enable signal, in response to the first mode signal,
   the switched capacitor converter is configured to be enabled in response to the first power-down signal, and is configured to step down the contactless voltage having a first voltage level to output the contactless mode first driving voltage having a second voltage level to the first node, the second voltage level being smaller than the first voltage level, and the bidirectional switched capacitor converter is configured to step down the contactless mode first driving voltage to output the contactless mode second driving voltage having a third voltage level to the second node, the third voltage level being smaller than the second voltage level.

3. The internal voltage generation circuit of claim 1, wherein, in a first sub mode in the contact mode when a voltage level of the contact voltage is greater than a reference voltage, the control signal generator is configured to disable the switched capacitor converter and the second contact switch, respectively, using the first power-down signal and the second switching enable signal, in response to the first mode signal and the second mode signal, the first contact switch is configured to switch the contact voltage having a first voltage level to the first node as the contact mode first driving voltage, and the bidirectional switched capacitor converter is enabled in response to the second power-down signal, and is configured to step down the contact mode first driving voltage to output the contact mode second driving voltage having a second voltage level to the second node, the second voltage level being smaller than the first voltage level.

4. The internal voltage generation circuit of claim 1, wherein, in a second sub mode in the contact mode when a voltage level of the contact voltage is smaller than a first reference voltage and is greater than a second reference voltage, the control signal generator is configured to disable the switched capacitor converter and the bidirectional switched capacitor converter, respectively, by using the first power-down signal and the second power-down signal, in response to the first mode signal and the second mode signal, the first contact switch is configured to switch the contact voltage to the first node as the contact mode first driving voltage, and the second contact switch is configured to switch the contact voltage to the second node as the contact mode second driving voltage.

5. The internal voltage generation circuit of claim 1, wherein, in a third sub mode in the contact mode when a voltage level of the contact voltage is smaller than a first reference voltage and a second reference voltage and the second reference voltage is smaller than the first reference voltage, the control signal generator is configured to disable the switched capacitor converter and the first contact switch, respectively, by using the first power-down signal and the first switching enable signal, in response to the first mode signal and the second mode signal, the second contact switch is configured to switch the contact voltage having a first voltage level to the second node as the contact mode second driving voltage, and the bidirectional switched capacitor converter is to be enabled in response to the second power-down signal, and is configured to boost the contact mode second driving voltage to output the contact mode first driving voltage having a second voltage level to the first node, the second voltage level being greater than the first voltage level.

6. The internal voltage generation circuit of claim 1, wherein the mode selector includes:

a comparator configured to compare the contactless voltage and the contact voltage to output a comparison signal;

a contact detector configured to output a detection signal associated with detecting an external reset signal based on the external reset signal received from the card reader in the contact mode;

a mode signal generator configured to generate the first mode signal and a contact mode signal designating the contact mode based on the comparison signal and the detection signal;

a class detector configured to be enabled in response to the contact mode signal, configured to compare the contact voltage with a first reference voltage and a second reference voltage to generate the second mode signal indicating a class of the card reader, associated with a sub-mode among the plurality of sub-modes, the second reference voltage being smaller than the first reference voltage;

a level comparator configured to compare the contact voltage, the contactless voltage and a first node voltage at the first node to output a selection signal indicating a highest voltage from among the contact voltage, the contactless voltage and the first node voltage; and a multiplexer configured to output the highest voltage from among the contact voltage, the contactless voltage and the first node voltage as the control voltage in response to the selection signal.

7. The internal voltage generation circuit of claim 6, wherein the mode signal generator is configured to generate the first mode signal and is configured to enable the contact mode signal based on a level of the comparison signal and a level of the detection signal.

8. The internal voltage generation circuit of claim 1, wherein the first contact switch includes:

a main switch including a first p-channel metal-oxide semiconductor (PMOS) transistor which has a source coupled to the contact voltage and a drain coupled to the first node;

an assist switch including a second PMOS transistor which has a source coupled to a gate of the main switch at a first internal node, a drain coupled to the contact voltage and a gate receiving an on-voltage associated with generating the control voltage;

a first delay circuit including a plurality of first inverters cascade-connected, the first delay circuit configured to operate based on the control voltage and configured to delay an assist switch power-down signal to generate the on-voltage;

a second delay circuit, connected to a second internal node, configured to operate based on the control voltage and configured to delay the first switching enable signal to provide the delayed first switching enable signal to the second internal node;

a second inverter connected between the first internal node and the second internal node;

a third inverter connected to the second inverter at a third internal node and connected between the third internal node and a ground voltage, the third inverter configured to invert the on-voltage to provide the inverted on-voltage to a fourth internal node;

a third PMOS transistor which has a source coupled to the third internal node, a gate coupled to the fourth internal node and a drain coupled to a fifth internal node;

an n-channel metal-oxide semiconductor (NMOS) capacitor coupled between the fifth internal node and the ground voltage;

a fourth PMOS transistor which has a drain coupled to the fifth internal node, a source coupled to a sixth internal node connected to the control voltage and a gate coupled to a seventh internal node; and a fourth inverter, connected between the sixth internal node and the ground voltage, configured to invert the on-voltage to provide the inverted on-voltage to the seventh internal node.

9. The internal voltage generation circuit of claim 8, wherein the assist switch is configured to be turned-on in response to the on-voltage before the control voltage is generated and is configured to prevent overcurrent flowing into the main switch.

10. The internal voltage generation circuit of claim 8, wherein the assist switch is configured to be turned-off in response to the on-voltage after the control voltage is generated and is configured to maintain a voltage of the gate of the main switch with a high level, and wherein the main switch is turned-on in response to the delayed first switching enable signal in the contact mode.

11. The internal voltage generation circuit of claim 8, wherein in the contact mode, the control voltage transitions to a level of the contact voltage in response to the contact voltage transitioning to a target level, a gate voltage of the third PMOS transistor transitions to a high level in response to the on-voltage being a low level and transitions to a low level in response to the on-voltage transitioning to a high level, and the assist switch power-down signal transitions to a high level in response to the control voltage being generated.

12. The internal voltage generation circuit of claim 11, wherein in the contact mode, a gate voltage of the main switch is maintained with a high level based on the contact voltage during a first interval in which the gate voltage of the third PMOS transistor is maintained with a high level, and is maintained with a high level based on the control voltage during a second interval, the second interval being posterior to the first interval and the first switching enable signal is disabled during the second interval.

13. The internal voltage generation circuit of claim 8, wherein in the contactless mode, a gate voltage of the fourth PMOS transistor transitions to a level of the contactless voltage in response to the contactless voltage transitioning to the level of the contactless voltage and transitions to a low level in response to the assist switch power-down signal transitioning to a high level.

14. The internal voltage generation circuit of claim 13, wherein, a gate voltage of the main switch is maintained with a high level based on the on-voltage during a first interval in which the assist switch power-down signal is maintained with a low level, and transitions to a high level during a second interval in which the assist switch power-down signal is maintained with a high level.

15. The internal voltage generation circuit of claim 8, wherein a first ratio associated with a channel width over a channel length of the main switch is M-times greater than a second ratio associated with a channel width over a channel length of the assist switch, and M is an integer greater than one.

16. The internal voltage generation circuit of claim 1, wherein the second contact switch includes:

a main switch including a first p-channel metal-oxide semiconductor (PMOS) transistor which has a source coupled to the contact voltage and a drain coupled to the second node;

an assist switch including a second PMOS transistor which has a source coupled to a gate of the main switch as a first internal node, a drain coupled to the contact voltage and a gate receiving an on-voltage associated with generating the control voltage;

a first delay circuit including a plurality of first inverters cascade-connected, the first delay circuit configured to operate based on the control voltage and configured to delay an assist switch power-down signal to generate the on-voltage;

a second delay circuit, connected to a second internal node, configured to operate based on the control voltage and configured to delay the first switching enable signal to provide the delayed first switching enable signal to the second internal node;

a second inverter connected between the first internal node and the second internal node;

a third inverter connected to the second inverter at a third internal node and connected between the third internal node and a ground voltage, the third inverter configured to invert the on-voltage to provide the inverted on-voltage to a fourth internal node;

a third PMOS transistor which has a source coupled to the third internal node, a gate coupled to the fourth internal node and a drain coupled to a fifth internal node;

an n-channel metal-oxide semiconductor (NMOS) capacitor coupled between the fifth internal node and the ground voltage;

a fourth PMOS transistor which has a drain coupled to the fifth internal node, a source coupled to a sixth internal node connected to the control voltage and a gate coupled to a seventh internal node;

a fourth inverter, connected between the sixth internal node and the ground voltage, configured to invert the on-voltage to provide the inverted on-voltage to the seventh internal node.

\* \* \* \* \*